(12) United States Patent
Miyazawa

(10) Patent No.: US 8,867,052 B2
(45) Date of Patent: Oct. 21, 2014

(54) MULTI-FUNCTION PERIPHERAL, COMMUNICATION SYSTEM, AND COMMUNICATION METHOD INDICATING AND OPERATION SETTING FUNCTION OR A USER SETTING FUNCTION OF THE MULTI-FUNCTION PERIPHERAL BASED ON RECEIVED INSTRUCTIONS

(75) Inventor: Masafumi Miyazawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 99 days.

(21) Appl. No.: 13/536,523

(22) Filed: Jun. 28, 2012

(65) Prior Publication Data
US 2013/0003100 A1 Jan. 3, 2013

(30) Foreign Application Priority Data

Jul. 1, 2011 (JP) ................. 2011-147072

(51) Int. Cl.
*G06F 3/12* (2006.01)
*H04N 1/00* (2006.01)

(52) U.S. Cl.
CPC ....... *H04N 1/00464* (2013.01); *H04N 1/00482* (2013.01); *H04N 1/00244* (2013.01); *H04N 2201/0039* (2013.01); *H04N 2201/0094* (2013.01)
USPC .. 358/1.13; 358/1.15; 358/402; 707/E17.117; 709/223; 709/201

(58) Field of Classification Search
CPC .............. H04N 2201/0094; H04N 2201/0039; H04N 1/00222; H04N 1/00408; H04N 1/00244; H04L 12/58; G06F 3/1288; G06F 3/1204
USPC ................ 358/1.15, 1.13, 402; 707/E17.117; 709/223, 201
See application file for complete search history.

(56) References Cited

U.S. PATENT DOCUMENTS

| 5,881,233 A | 3/1999 | Toyoda et al. |
| 2006/0114498 A1 | 6/2006 | Yanagi et al. |
| 2006/0172730 A1* | 8/2006 | Matsuda ................. 455/420 |

(Continued)

FOREIGN PATENT DOCUMENTS

| CN | 1770772 A | 5/2006 |
| EP | 2 169 936 A2 | 3/2010 |

(Continued)

OTHER PUBLICATIONS

Chinese Office Action issued in CN 201210225297 .2, mailed Aug. 5, 2014.

*Primary Examiner* — Jacky X Zheng
(74) *Attorney, Agent, or Firm* — Merchant & Gould PC

(57) ABSTRACT

A multi-function peripheral is connected to an instruction device and performs each operation function of a plurality of operation functions in accordance with an instruction from the instruction device. The multi-function peripheral includes an input unit, a communication unit and a controller. The controller is configured to perform: a function selecting process; an instruction requesting process; an input-information receiving process of receiving input information for performing one operation function of the plurality of operation functions; an operation-setting function process; an input-information transmitting process; and a user-setting function process including setting user-specific information on a basis of the input information. The controller of the multi-function peripheral is configured not to transmit the user-specific information, which is set in the user-setting function process, to the instruction device.

18 Claims, 22 Drawing Sheets

(56) References Cited

U.S. PATENT DOCUMENTS

2006/0176509 A1* 8/2006 Aoki et al. ............... 358/1.15
2010/0083042 A1 4/2010 Yamada
2010/0131609 A1* 5/2010 Tonegawa et al. ............ 709/206
2012/0113469 A1 5/2012 Urakawa
2012/0117629 A1 5/2012 Miyazawa et al.

FOREIGN PATENT DOCUMENTS

| | | |
|---|---|---|
| JP | H08-242326 A | 9/1996 |
| JP | 2001-337797 A | 12/2001 |
| JP | 2010-081380 A | 4/2010 |

* cited by examiner

FIG. 4

| SETTING IDENTIFIER | SETTING ITEM | SETTING VALUE | INPUT FORMAT |
|---|---|---|---|
| 1 | SMTP SERVER | ◎◎ | TEXT |
| 2 | SERVER PORT | 25 | NUMERAL VALUE |
| 3 | Auth. For SMTP | ON | SELECTION |
| 4 | EMAIL ADDRESS | ○○ | TEXT |
| 5 | ACCOUNT NAME | △△ | TEXT |
| 6 | PASSWORD | ×× | TEXT |
| 7 | RESOLUTION FOR SCANNING | 600 | SELECTION |
| 8 | SHEET SIZE FOR SCANNING | A4 | SELECTION |
| 9 | DATA FORMAT FOR SCANNING | JPEG | SELECTION |

FIG. 5A

COMMAND RESULT: SETTING-VALUE
               ACQUISITION RESULT
COMMAND RESULT PARAMETERS:
    SETTING IDENTIFIER: 7
    SETTING VALUE: 600

SETTING IDENTIFIER: 8
    SETTING VALUE: A4

SETTING IDENTIFIER: 9
    SETTING VALUE: JPEG

FIG. 5B

COMMAND RESULT: SCREEN DISPLAY
               RESULT
DETAIL OF COMMAND RESULT: SELECTION
COMMAND RESULT PARAMETERS:
    ITEM: RESOLUTION FOR SCANNING
    SETTING VALUE: 1000

ITEM: SHEET SIZE FOR SCANNING
    SETTING VALUE: A4

ITEM: DATA FORMAT FOR SCANNING
    SETTING VALUE: JPEG

FIG. 5C

COMMAND RESULT: SETTING-VALUE
               STORAGE RESULT
COMMAND RESULT PARAMETERS:
SETTING IDENTIFIER: 7
SET RESULT: OK

COMMAND RESULT PARAMETERS:
SETTING IDENTIFIER: 8
SET RESULT: OK

COMMAND RESULT PARAMETERS:
SETTING IDENTIFIER: 9
SET RESULT: OK

FIG. 5D

COMMAND RESULT: SECRET SET RESULT

COMMAND RESULT PARAMETERS:
    SETTING IDENTIFIER: 1
    SET RESULT: OK

SETTING IDENTIFIER: 2
    SET RESULT: OK

SETTING IDENTIFIER: 3
    SET RESULT: OK

SETTING IDENTIFIER: 4
    SET RESULT: OK

SETTING IDENTIFIER: 5
    SET RESULT: OK

SETTING IDENTIFIER: 6
    SET RESULT: OK

FIG. 5E

COMMAND RESULT: ScanToMail RESULT

COMMAND RESULT PARAMETER:
               PERFORMANCE RESULT: OK

FIG. 6A

COMMAND: UI DISPLAY
TITLE: MENU

COMMAND PARAMETER:
ICON NAME: SCAN SETTING
REPLY DESTINATION URL: http//XYZ/scan-option/start COMMAND PARAMETER:
ICON NAME: EMAIL SETTING
REPLY DESTINATION URL: http//XYZ/email-option/start COMMAND PARAMETER:
ICON NAME: EMAIL ScanToEmail
REPLY DESTINATION URL: http//XYZ/scantoemail/start

FIG. 6B

COMMAND: SETTING-VALUE ACQUISITION

COMMAND PARAMETERS:
    SETTING IDENTIFIER: 7
    SETTING IDENTIFIER: 8
    SETTING IDENTIFIER: 9

REPLY DESTINATION URL:
http//XYZ/scan-option/display

FIG. 6C

COMMAND: SCREEN DISPLAY
DETAIL OF COMMAND: SELECTION
TITLE: SCAN SETTING
COMMAND PARAMETERS:
    ITEM NAME: RESOLUTION FOR SCANNING
    LIST: 600, 1000, 1200
    INITIAL VALUE: 600

ITEM NAME: SHEET SIZE FOR SCANNING
    LIST: A4, B5, A5, B5, A6
    INITIAL VALUE: A4

ITEM NAME: DATA FORMAT FOR SCANNING
    LIST: JPEG, BMP, TIFF, PDF
    INITIAL VALUE: JPEG

REPLY DESTINATION URL:
http//XYZ/scan-option/input

FIG. 6D

```
COMMAND: SETTING-VALUE STORAGE

COMMAND PARAMETERS:
    SETTING IDENTIFIER: 7
    SETTING VALUE: 1000

SETTING IDENTIFIER: 8
    SETTING VALUE: A3

SETTING IDENTIFIER: 9
    SETTING VALUE: PDF

REPLY DESTINATION URL:
http://XYZ/scan-option/end
```

FIG. 6F

```
COMMAND: ScanToMail

COMMAND PARAMETER: NONE

REPLY DESTINATION URL:
http://XYZ/scantoemail/end
```

FIG. 6E

```
COMMAND: SECRET SETTING
TITLE: EMAIL SETTING
COMMAND PARAMETERS:
    ITEM NAME: EMAIL SERVER
    SETTING IDENTIFIER: 1

ITEM NAME: SERVER PORT
    SETTING IDENTIFIER: 2

ITEM NAME: Auth. For SMTP
    SETTING IDENTIFIER: 3
    LIST: ON, OFF

ITEM NAME: EMAIL ADDRESS
    SETTING IDENTIFIER: 4

ITEM NAME: ACCOUNT NAME
    SETTING IDENTIFIER: 5

ITEM NAME: PASSWORD
    SETTING IDENTIFIER: 6

REPLY DESTINATION URL:
http://XYZ/email-option/end
```

FIG. 7

| XML TEXT OR MODULE | URL OF XML TEXT OR MODULE |
|---|---|
| XML TEXT FOR MENU | http://XYZ/menu.xml |
| XML TEXT FOR SETTING-VALUE ACQUISITION INSTRUCTION | http://XYZ/scan-option/start.xml |
| INSTRUCTING MODULE FOR RECEIVING INPUT VALUES | http://XYZ/scan-option/display |
| INSTRUCTING MODULE FOR STORING SETTING VALUES | http://XYZ/scan-option/input |
| INSTRUCTING MODULE FOR FINISHING SCAN SETTING | http://XYZ/scan-option/end |
| XML TEXT FOR INSTRUCTING EMAIL SETTING | http://XYZ/email-option/start.xml |
| INSTRUCTING MODULE FOR FINISHING EMAIL SETTING | http://XYZ/email-option/end |
| XML TEXT FOR INSTRUCTING ScanToEmail | http://XYZ/scantoemail/start.xml |
| INSTRUCTING MODULE FOR FINISHING ScanToEmail | http://XYZ/scantoemail/end |

FIG. 8A

MENU

| SCAN SETTING | EMAIL SETTING | ScanToEmail |

FIG. 8B

SCAN SETTING — FINISH / OK

| RESOLUTION FOR SCANNING | 600 |
| SHEET SIZE FOR SCANNING | A4 |
| DATA FORMAT FOR SCANNING | JPEG |

FIG. 8C

SCAN SETTING — FINISH / OK

| RESOLUTION FOR SCANNING | 600 |
| SHEET SIZE FOR SCANNING | 1000 |
| DATA FORMAT FOR SCANNING | 1200 |

FIG. 8D

SCAN SETTING — FINISH / OK

| RESOLUTION FOR SCANNING | 1000 |
| SHEET SIZE FOR SCANNING | A4 |
| DATA FORMAT FOR SCANNING | JPEG |

FIG. 8E

EMAIL SETTING — FINISH / OK / ▶

| SMTP SERVER | ◎◎ |
| SERVER PORT | 25 |
| Auth. For SMTP | ON |

FIG. 8F

EMAIL SETTING — FINISH / OK / ◀

| EMAIL ADDRESS | ○○ |
| ACCOUNT NAME | △△ |
| PASSWORD | ×× |

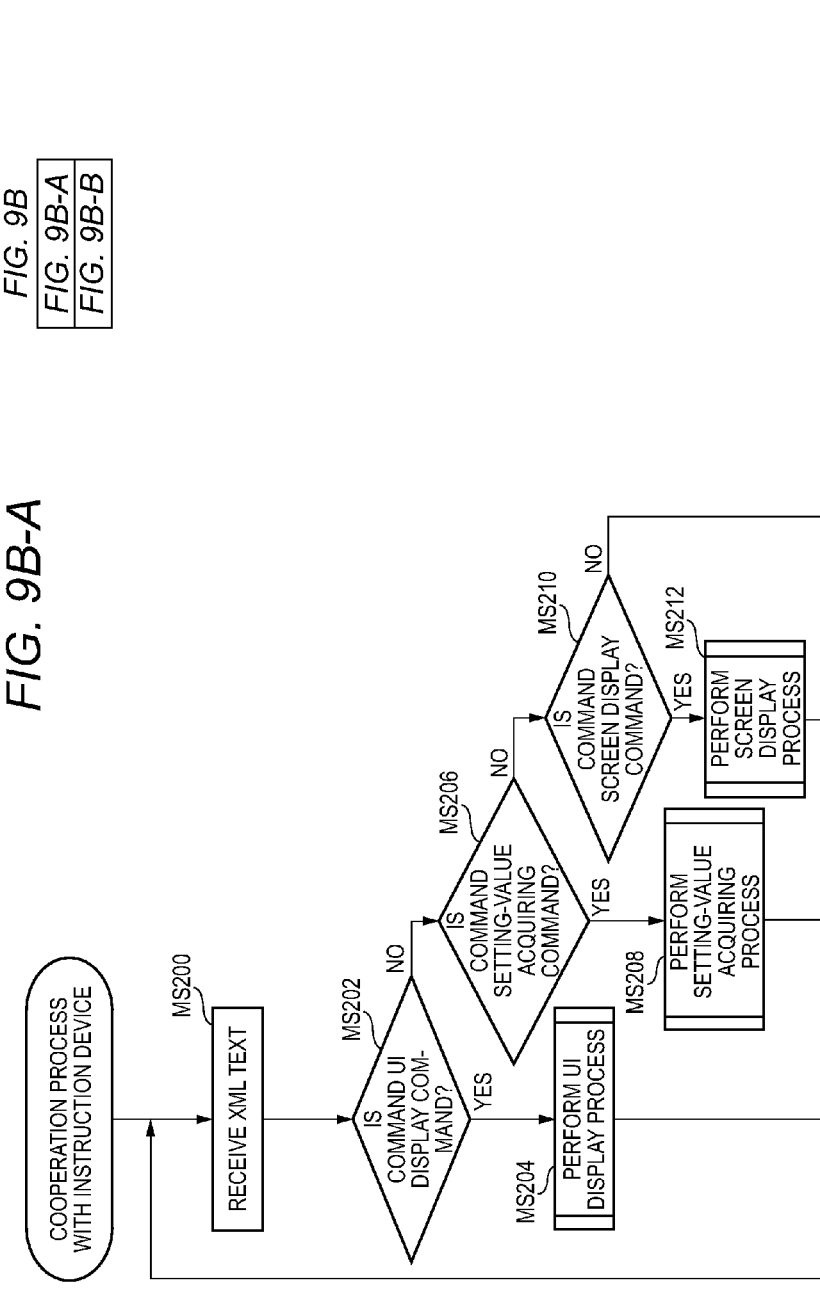

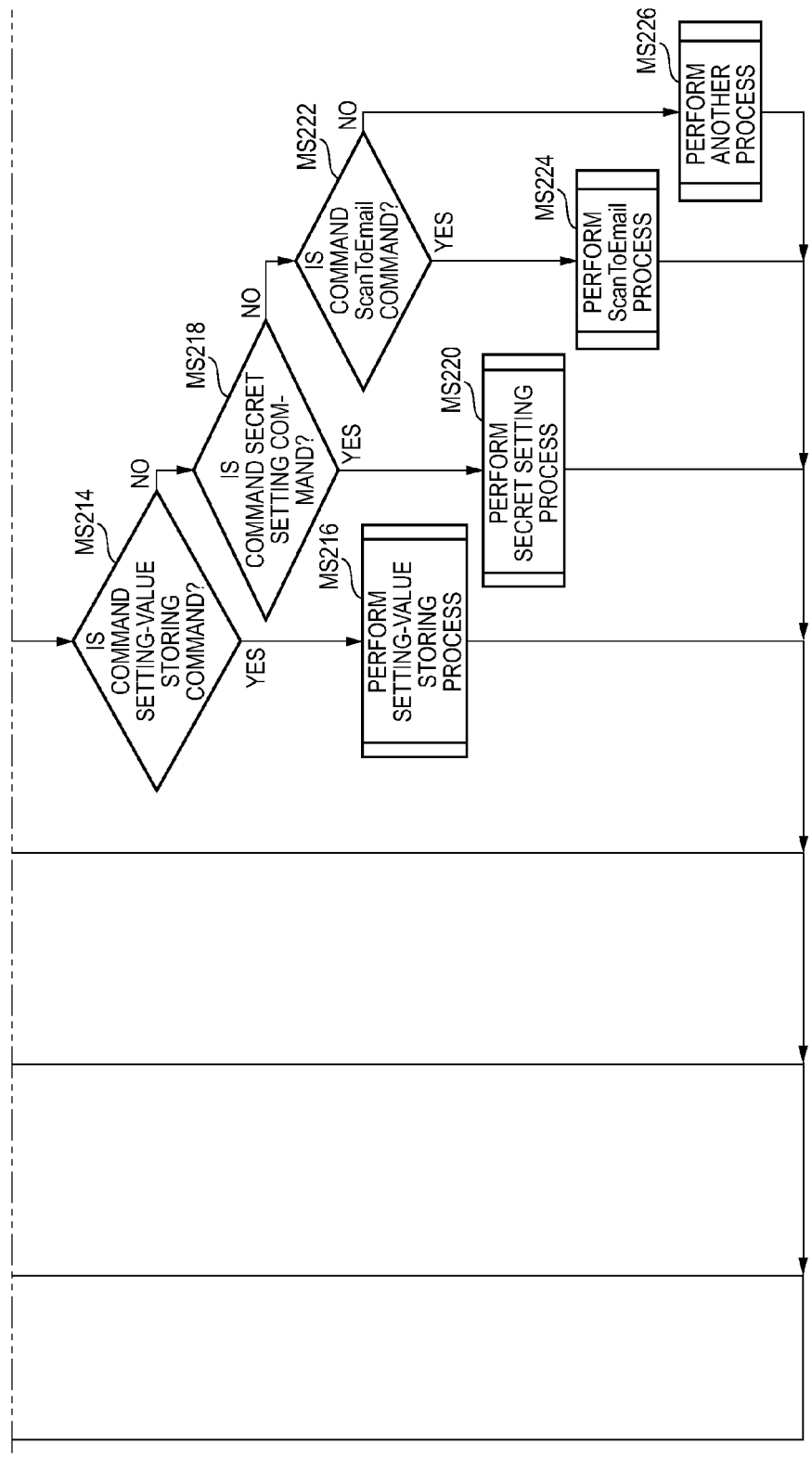
FIG. 9B-B

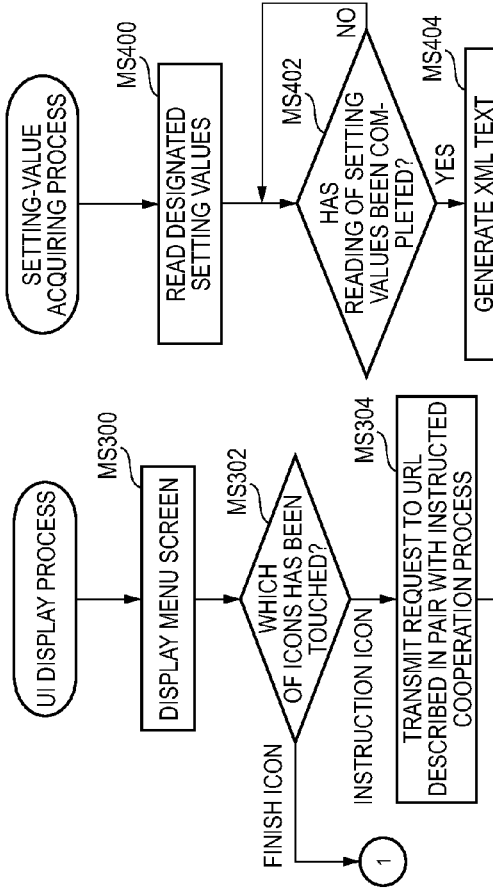

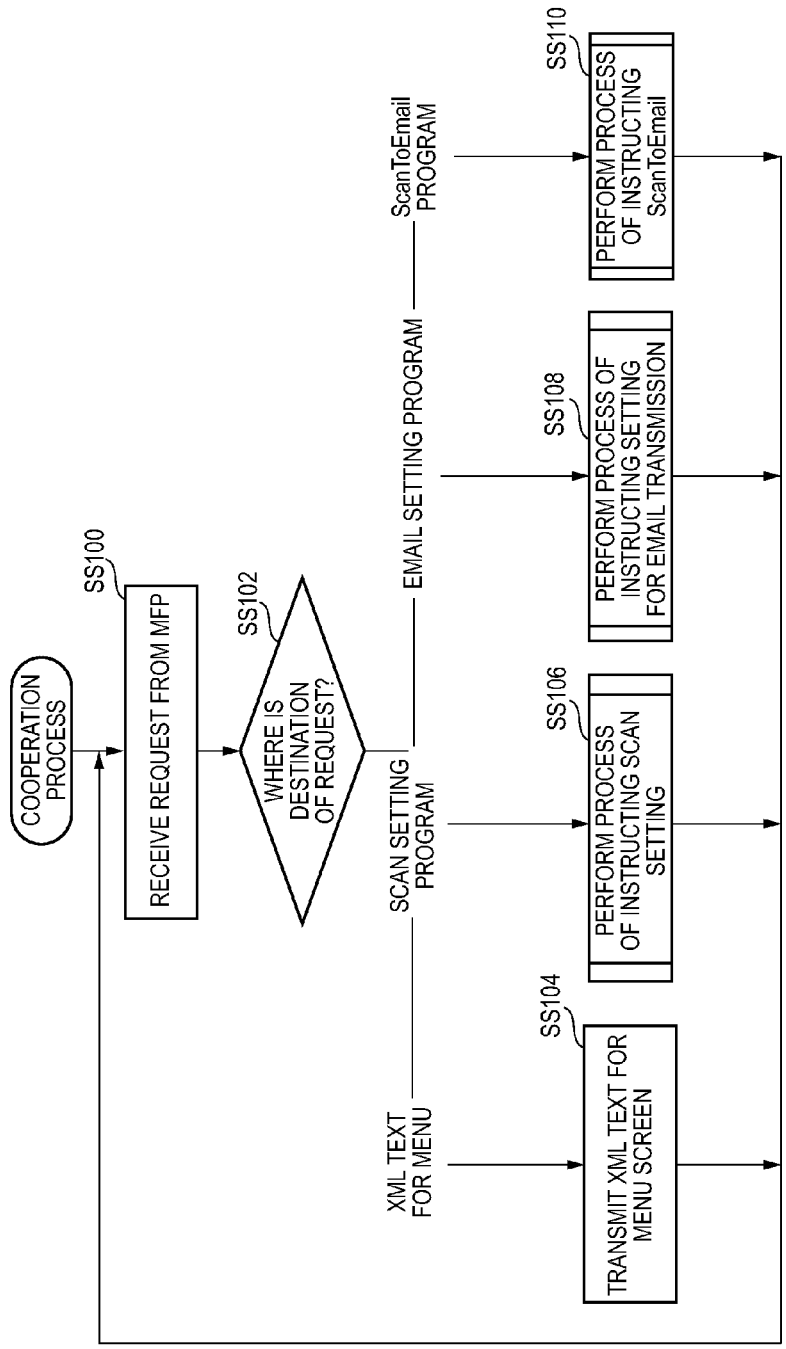

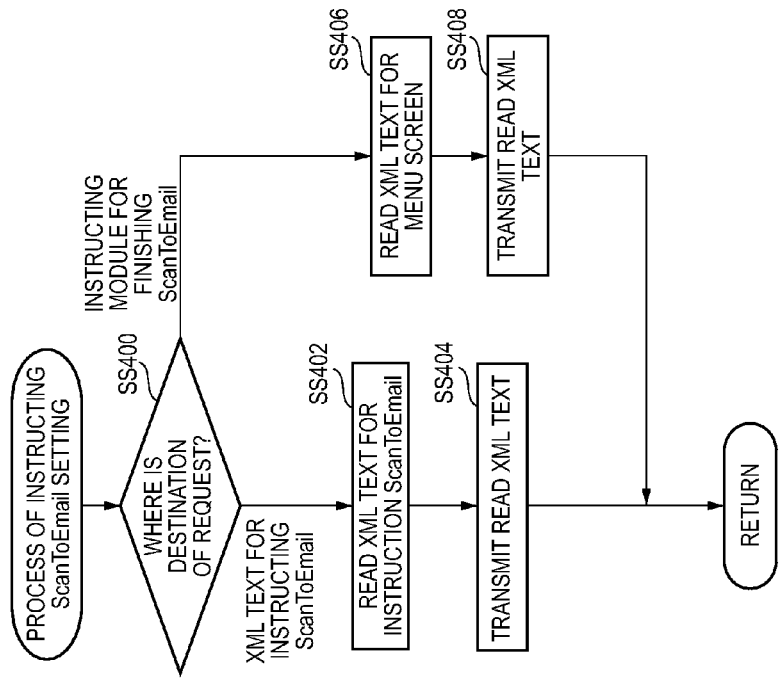
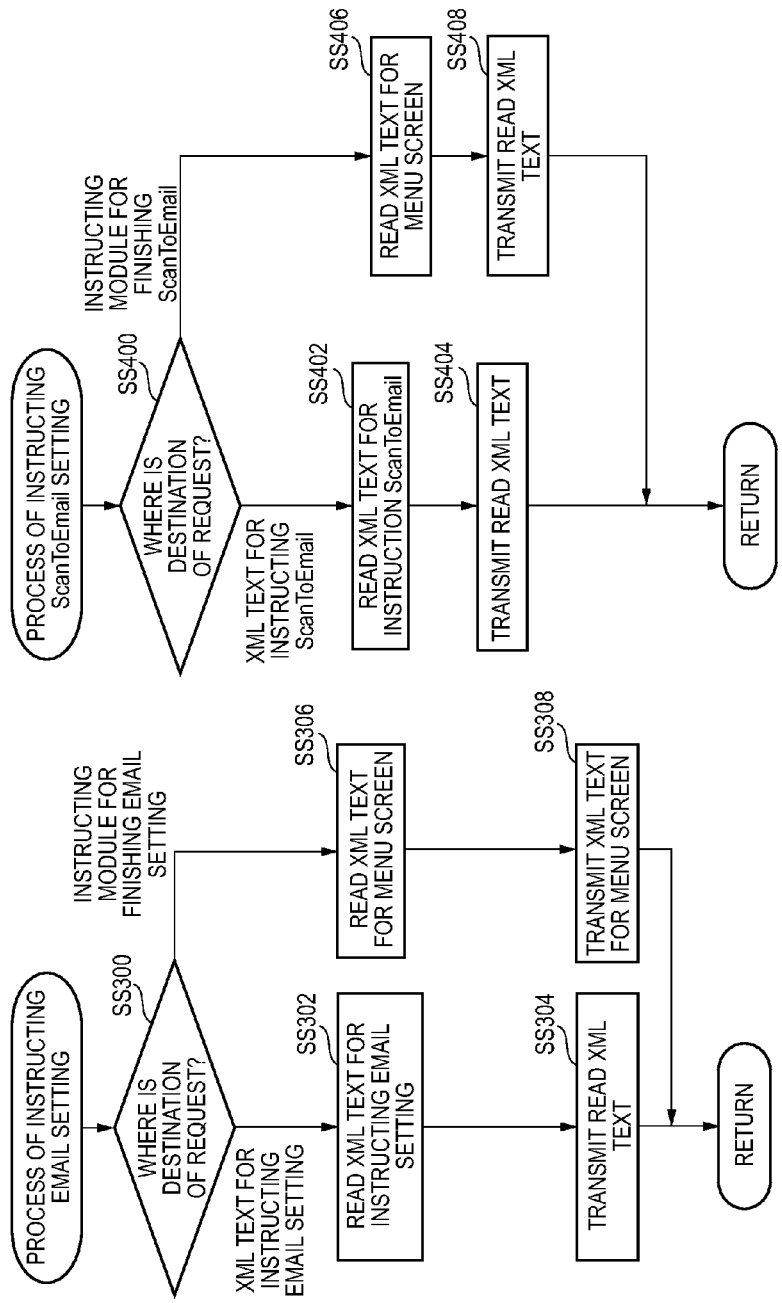

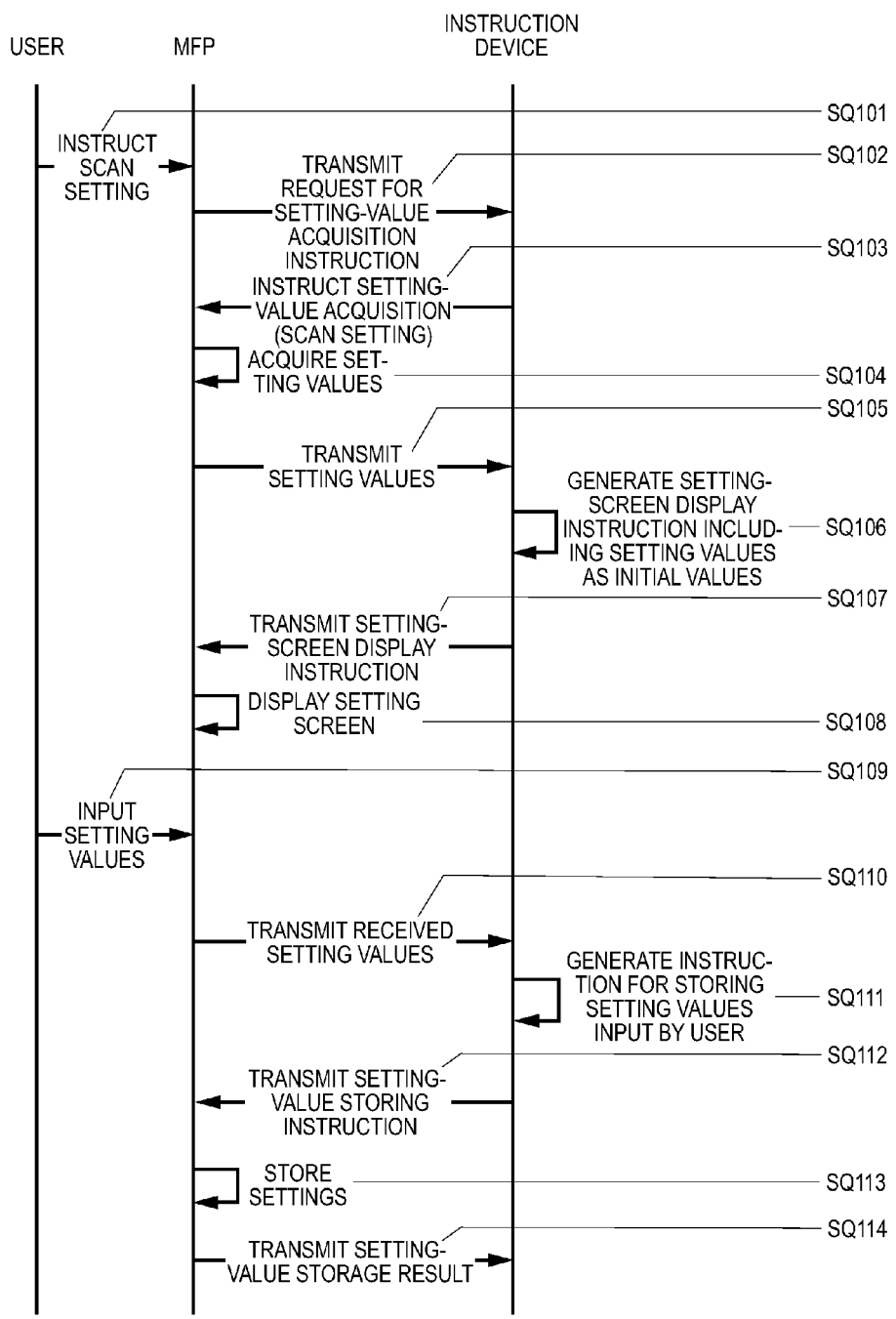

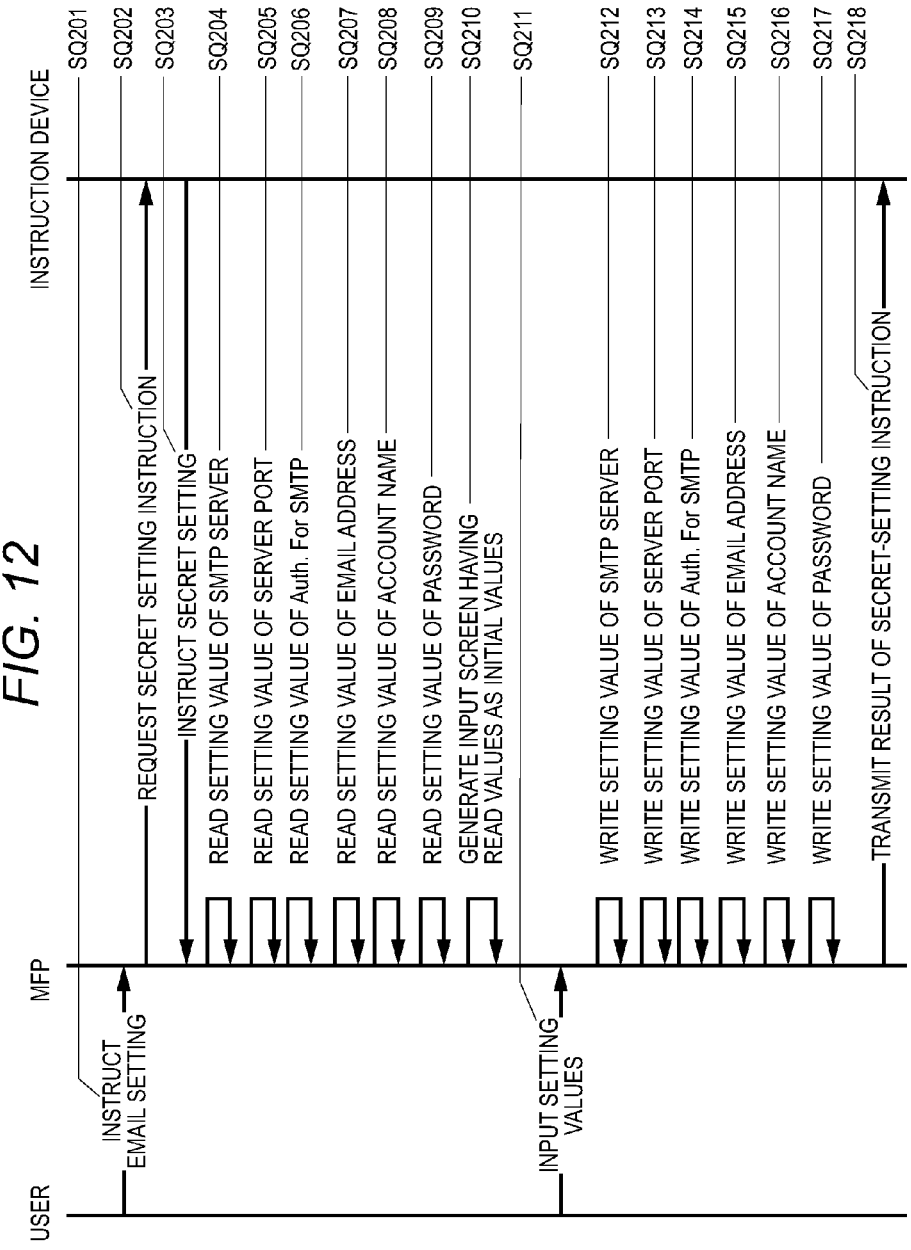

*FIG. 14A*

```
COMMAND: UI DISPLAY
TITLE: MENU

COMMAND PARAMETER:
ICON NAME: PRINT SETTING
REPLY DESTINATION URL: http//XYZ/print-
option/start.xml COMMAND PARAMETER:
ICON NAME: SCAN SETTING
REPLY DESTINATION URL: http//XYZ/scan-
option/start.xml COMMAND PARAMETER:
ICON NAME: EMAIL SETTING
REPLY DESTINATION URL: http//XYZ/menue2.xml
```

*FIG. 14B*

```
COMMAND: UI DISPLAY
TITLE: EMAIL SETTING

COMMAND PARAMETER:
ICON NAME: TRANSMISSION SETTING
REPLY DESTINATION URL: http//XYZ/email-
option/start.xml COMMAND PARAMETER:
ICON NAME: RECEPTION SETTING
REPLY DESTINATION URL: http//XYZ/email-reception-
option/start.xml
```

MULTI-FUNCTION PERIPHERAL, COMMUNICATION SYSTEM, AND COMMUNICATION METHOD INDICATING AND OPERATION SETTING FUNCTION OR A USER SETTING FUNCTION OF THE MULTI-FUNCTION PERIPHERAL BASED ON RECEIVED INSTRUCTIONS

CROSS-REFERENCE TO RELATED APPLICATIONS

This application claims priority from Japanese Patent Application No. 2011-147072 filed on Jul. 1, 2011, the entire subject matter of which is incorporated herein by reference.

TECHNICAL FIELD

The present invention relates to a multi-function peripheral capable of performing various operation functions in accordance with instructions from an instruction device, a communication system, and a communication method.

BACKGROUND

In devices called multi-function devices, there are known devices capable of email transmission and reception, or uploading or downloading files with respect to servers connected through networks.

Recently, web services have spread, and there have been provided servers capable of storing electronic files on networks. For example, a Picasa (a registered trademark) web album or flickr (a registered trademark) is an example of the web services. Users who desire to use those web services need to prepare devices connected to service providing apparatuses through networks, prior to using the services.

Since web services provided by service providing apparatuses are expanded day by day, in order for use of the web services, application program interfaces (API) provided by service providers are sometimes changed according to the expansion of the web services.

SUMMARY

Therefore, a device capable of dealing with changes of the APIs with less frequency of updating firmware or without updating firmware is desirable.

According to one illustrative aspect of the invention, there is provided a multi-function peripheral configured to be connected to an instruction device and perform each operation function of a plurality of operation functions in accordance with an instruction from the instruction device. The multi-function peripheral comprises: an input unit; a communication unit; and a controller. The controller is configured to perform: a function selecting process of selecting one operation function designated through the input unit from the plurality of operation functions; an instruction requesting process of transmitting an instruction request for performing the operation function selected in the function selecting process to the instruction device via the communication unit; an input-information receiving process of receiving input information for performing one operation function of the plurality of operation functions through the input unit; an operation-setting function process comprising: if the operation-setting function is selected from the plurality of operation functions in the function selecting process, receiving a response instruction for performing the operation-setting function from the instruction device; and in accordance with the received response instruction, setting operation information; an input-information transmitting process of transmitting the operation information, which is received in the input-information receiving process, to the instruction device; and a user-setting function process comprising: if a user-setting function is selected from the plurality of operation functions in the function selecting process, receiving a response instruction for performing the user-setting function from the instruction device via the communication unit; and in accordance with the received response instruction, setting user-specific information on the basis of the input information received in the input-information receiving process. The controller is configured not to transmit the user-specific information, which is set in the user-setting function process, to the instruction device.

According to another illustrative aspect of the invention, there is provided a communication system comprising: a multi-function peripheral configured to perform a plurality of operation functions; and an instruction device configured to be connected to the multi-function peripheral and transmit an instruction for performing each operation function of a plurality of operation functions to the multi-function peripheral. The multi-function peripheral comprises: an input unit; a first communication unit; and a first controller. The first controller is configured to perform: a function selecting process of selecting one operation function designated through the input unit from the plurality of operation functions; an instruction requesting process of transmitting an instruction request for performing the operation function selected in the function selecting process to the instruction device via the first communication unit; an input-information receiving process of receiving input information for performing one operation function of the plurality of operation functions through the input unit; an operation-setting function process comprising: if the operation-setting function is selected from the plurality of operation functions in the function selecting process, receiving a response instruction for performing the operation-setting function from the instruction device; and in accordance with the received response instruction, setting operation information; an input-information transmitting process of transmitting the operation information, which is received in the input-information receiving process, to the instruction device; and a user-setting function process comprising: if a user-setting function is selected from the plurality of operation functions in the function selecting process, receiving a response instruction for performing the user-setting function from the instruction device via the first communication unit; and in accordance with the received response instruction, setting user-specific information on the basis of the input information received in the input-information receiving process. The instruction device comprises: a second communication unit; and a second controller. The second controller is configured to perform: a response instruction process of receiving the instruction request, via the second communication unit, which the multi-function peripheral transmits in the instruction requesting process and transmitting the response instruction for performing the selected operation function to the multi-function peripheral in response to the instruction request via the second communication unit; and an operation instructing process comprising: receiving the input-information which the multi-function peripheral transmits in the input-information transmitting process; generating the response instruction for performing the operation-setting function on a basis of the received input-information; and transmitting the generated response instruction to the multi-function peripheral. The first controller of the multi-function peripheral is configured not to transmit user-specific information, which is set in the user-setting function process, to the instruction device.

According to still another illustrative aspect of the invention, there is provided a communication method for a multi-function peripheral. The multi-function peripheral is configured to be connected to an instruction device and perform a plurality of operation functions in accordance with an instruction from the instruction device. The multi-function peripheral including an input unit and a communication unit configured to communicate with the instruction device. The communication method comprises: a function selecting step of selecting one operation function designated through the input unit from the plurality of operation functions; an instruction requesting step of transmitting an instruction request for performing the operation function selected in the function selecting step to the instruction device via the communication unit; an input-information receiving step of receiving input information for performing one operation function of the plurality of operation functions through the input unit; an operation-setting function step comprising: if the operation-setting function is selected from the plurality of operation functions in the function selecting step, receiving a response instruction for performing the operation-setting function from the instruction device; and in accordance with the received response instruction, setting operation information; an input-information transmitting step of transmitting the operation information, which is received in the input-information receiving step, to the instruction device; and a user-setting function step comprising: if the user-setting function is selected from the plurality of operation functions in the function selecting step, receiving a response instruction for performing the user-setting function from the instruction device via the communication unit; and in accordance with the received response instruction, setting user-specific information on the basis of the input information received in the input-information receiving step. The operation-setting function step is completed after the input-information transmitting step, and the user-setting function step is completed without transmitting the input information which is received in the input-information receiving step.

According to still another illustrative aspect of the invention, there is provided a non-transitory computer-readable recording medium storing a program for controlling a multi-function peripheral, which is configured to be connected to an instruction device and perform a plurality of operation functions in accordance with an instruction from the instruction device, the multi-function peripheral including an input unit, a communication unit configured to communicate with the instruction device and a computer. The program, when executed by the computer, causes the computer to perform processes comprising: a function selecting process of selecting one operation function designated through the input unit from the plurality of operation functions; an instruction requesting process of transmitting an instruction request for performing the operation function selected in the function selecting process to the instruction device via the communication unit; an input-information receiving process of receiving input information for performing one operation function of the plurality of operation functions through the input unit; an operation-setting process comprising: if the operation-setting function is selected from the plurality of operation functions in the function selecting process, receiving a response instruction for performing the operation-setting function from the instruction device; and in accordance with the received response instruction, setting operation information; an input-information transmitting process of transmitting the operation information, which is received in the input-information receiving process, to the instruction device; and a user-setting process comprising: if a user-setting function is selected from the plurality of operation functions in the function selecting process, receiving a response instruction for performing the user-setting function from the instruction device; and in accordance with the received response instruction, setting user-specific information on the basis of the input information received in the input-information receiving process. The operation-setting function process is completed after the input-information transmitting process, and the user-setting function process is completed without transmitting the input information which is received in the input-information receiving process.

BRIEF DESCRIPTION OF THE DRAWINGS

FIG. 4 is a schematic diagram of a setting-value management table;

FIGS. 5A to 5E are schematic views illustrating the description contents of XML texts that are related to various operation results and are transmitted to the instruction device;

FIGS. 6A, 6B, and 6C are schematic views illustrating the description contents of XML texts which are related to various instructions and which the instruction device transmits to the MFP;

FIGS. 6D, 6E, and 6F are schematic views illustrating the description contents of XML texts which are related to various instructions and which the instruction device transmits to the MFP;

FIG. 7 shows the contents and URLs of XML texts and program modules which constitute an instruction program;

FIGS. 8A to 8F show examples of screens which are displayed on a display unit, in which FIG. 8A shows a menu screen which is displayed in accordance with FIG. 6A, FIGS. 8B, 8C, and 8D show scan setting screens which are displayed in accordance with FIG. 6C, and FIG. 8E shows an email setting screen which is generated in accordance with FIG. 6E;

FIGS. 9B-A and 9B-B are flow charts illustrating a cooperation process with the instruction device performed by the MFP;

FIGS. 9C, 9D, and 9E are flow charts illustrating processes performed by the MFP, in which FIG. 9C shows a UI display process, FIG. 9D shows a setting-value acquiring process, and FIG. 9E shows a screen display process;

FIGS. 9F, 9G, and 9H are flow charts illustrating processes performed by the MFP, in which FIG. 9F shows a setting-value storing process, FIG. 9G shows a secret setting process, and FIG. 9H is a ScanToEmail process;

FIG. 10A is a flow chart illustrating a cooperation process with the MFP performed by the instruction device;

FIGS. 10C and 10D are flow charts illustrating processes performed by the instruction device, in which FIG. 10C shows an instruction process for email setting, and FIG. 10D shows an instruction process for ScanToEmail;

FIG. 11 is a sequence diagram illustrating a process procedure in which the MFP performs scan setting in accordance with an XML text that is received from the instruction device;

FIG. 12 is a sequence diagram illustrating a process procedure in which the MFP performs email setting in accordance with an XML text that is received from the instruction device;

FIGS. 14A and 14B are schematic views illustrating the description contents of XML texts which are related to various instructions and which an instruction device according a modified exemplary embodiment transmits to the MFP;

FIGS. 15A and 15B are views illustrating examples of screens which are displayed on a display unit of the MFP according to the modified exemplary embodiment, in which FIG. 15A shows a menu screen which is displayed in accordance with FIG. 14A, and FIG. 15B shows a menu screen which is displayed in accordance with FIG. 14B.

DETAILED DESCRIPTION

Exemplary Embodiments

Configuration of System

Figure 1:
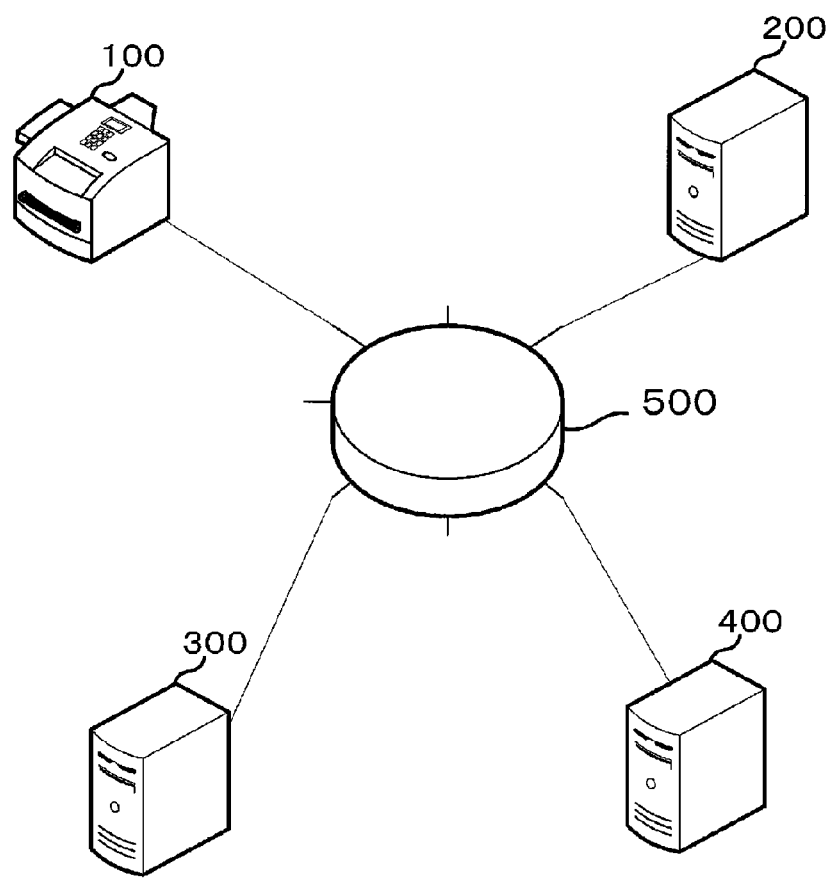
FIG. 1 is a system configuration view illustrating an example of an entire configuration of a communication system according to an exemplary embodiment of the present invention.

Hereinafter, a communication system according to an exemplary embodiment of the present invention will be described with reference to the accompanying drawings. As shown in FIG. 1, a multi-function peripheral (hereinafter, referred to as an MFP) 100 and an instruction device 200 are connected to the Internet 500. Further, each of the MFP 100 and the instruction device 200 is connected to a simple mail transfer protocol server (hereinafter, referred to as an SMTP server) 300 and a service providing server 400 through the Internet 500. Although only one MFP 100 is shown in FIG. 1, actually, a plurality of MFPs 100 may be connected to the Internet 500 and perform various operation functions in accordance with instructions from the instruction device 200.

The MFP 100 is a digital multi-function device having a printing function, a scanner function, a fax function, and a copy function. The instruction device 200 is a server provided by a maker of the MFP 100. The instruction device 200 includes programs necessary for transmitting XML texts for instructing various processes to the MFP 100. In accordance with the XML texts received from the instruction device 200, the MFP 100 can perform processes that are unable to be performed only by firmware stored in the MFP 100. In other words, the instruction device 200 can, by transmitting the XML texts to the MFP 100, expand processes performed by the MFP 100. Examples of the expanded processes includes uploading of files to service providing server 400 connected through the Internet, Email transmission, various kinds of setting, and the like.

If a user performs account registration of a device such as a PC having a web browser, the service providing server 400 issues an email address, account name, and password unique to the user's device. If a user performs account registration of a PC, the user's PC can store files in a virtual area of the service providing server 400 assigned to the PC. In other words, the user's PC whose account has been registered can upload or download files with respect to the assigned virtual area of the service providing server 400.

In the present exemplary embodiment, it is assumed that, if an email with an attached file is transmitted to an email address issued to a PC capable of performing email transmission, the attached file is uploaded to a user-specific area of the service providing server 400.

The SMTP server 300 receives email data through the Internet 500. The SMTP server 300 transmits the received email data to the service providing server 400.

(Configuration of MFP 100)

Figure 2:
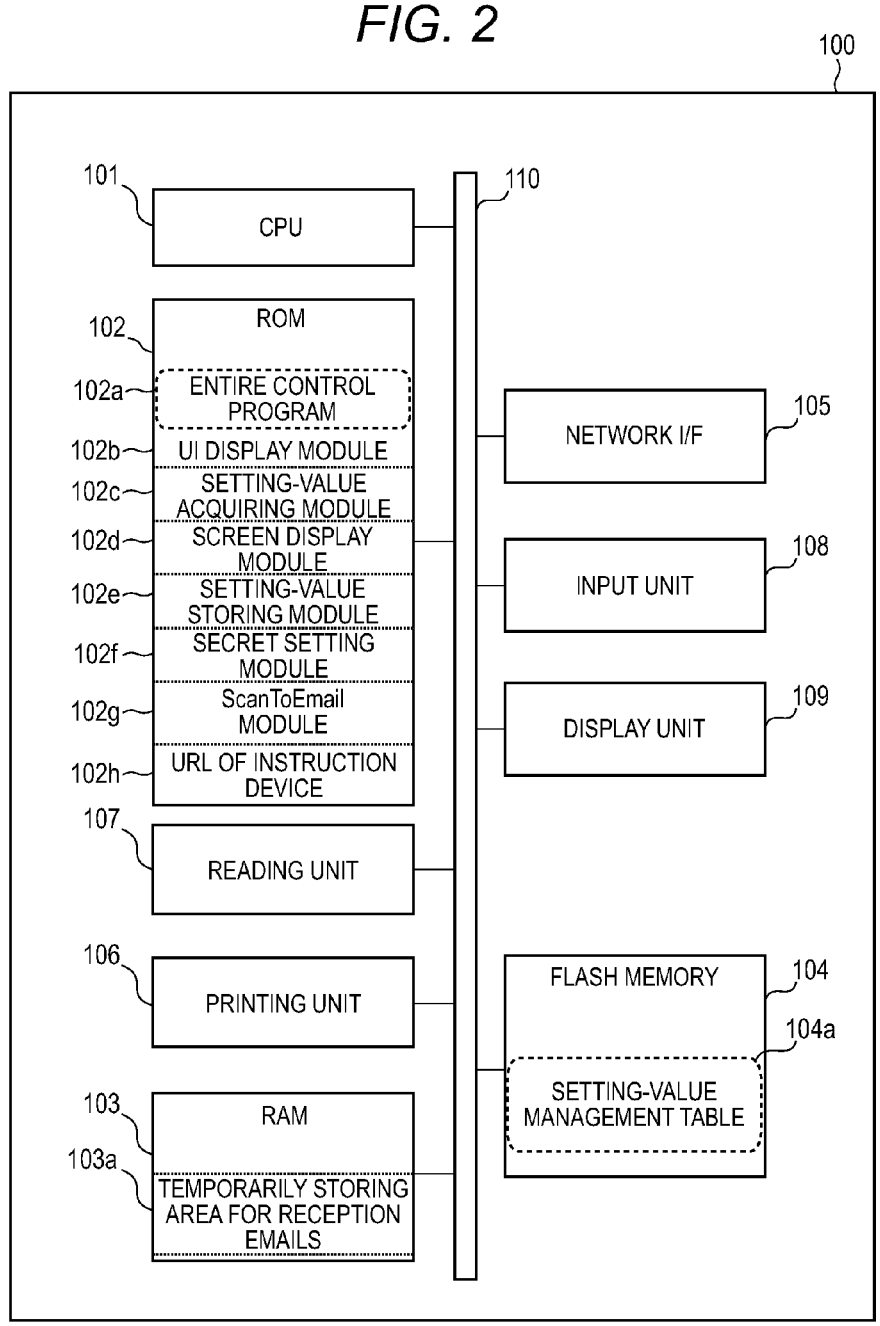
FIG. 2 is a block diagram illustrating an example of a hardware configuration of an MFP.

As shown in FIG. 2, the MFP 100 includes a CPU 101, a ROM 102, a RAM 103, a flash memory 104, a network interface (network I/F) 105, a printing unit 106, a reading unit 107, an input unit 108, and a display unit 109, as hardware components. These hardware components are connected to one another through bus lines 110. The CPU 101, ROM 102, RAM 103 and bus lines 110 are examples of a controller. The network I/F 105 is one example of a communication unit.

The CPU 101 performs operations in accordance with programs stored in the ROM 102, and performs instructions on the individual hardware components. The ROM 102 is a non-volatile memory which stores an entire control program 102a, a UI display module 102b, a setting-value acquiring module 102c, a screen display module 102d, a setting-value storing module 102e, a secret setting module 102f, a ScanToEmail module 102g, and the URL 102h of the instruction device 200.

Figure 9A:
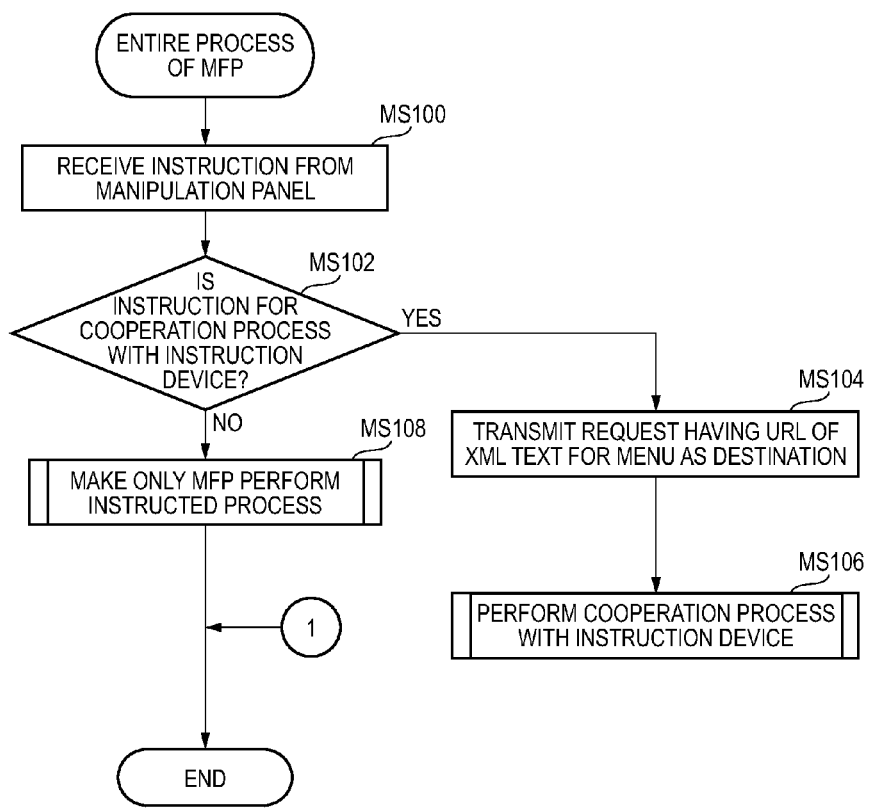
FIG. 9A is a flow chart illustrating an entire process performed by the MFP.

The MFP 100 performs processes shown in FIGS. 9A and 9B and other general processes, in accordance with the entire control program 102a. Further, the MFP 100 performs a process shown in FIG. 9C, in accordance with the UI display module 102b. The MFP 100 performs a process shown in FIG. 9D, in accordance with the setting-value acquiring module 102c. In STEP MS404 of FIG. 9, the MFP 100 generates an XML text which describes contents shown in FIG. 5A.

The MFP 100 performs a process shown in FIG. 9E, in accordance with the screen display module 102d. In STEP MS506 of FIG. 9E, the MFP 100 generates an XML text which describes contents shown in FIG. 5B.

Figures 9F, 9G, 9H:
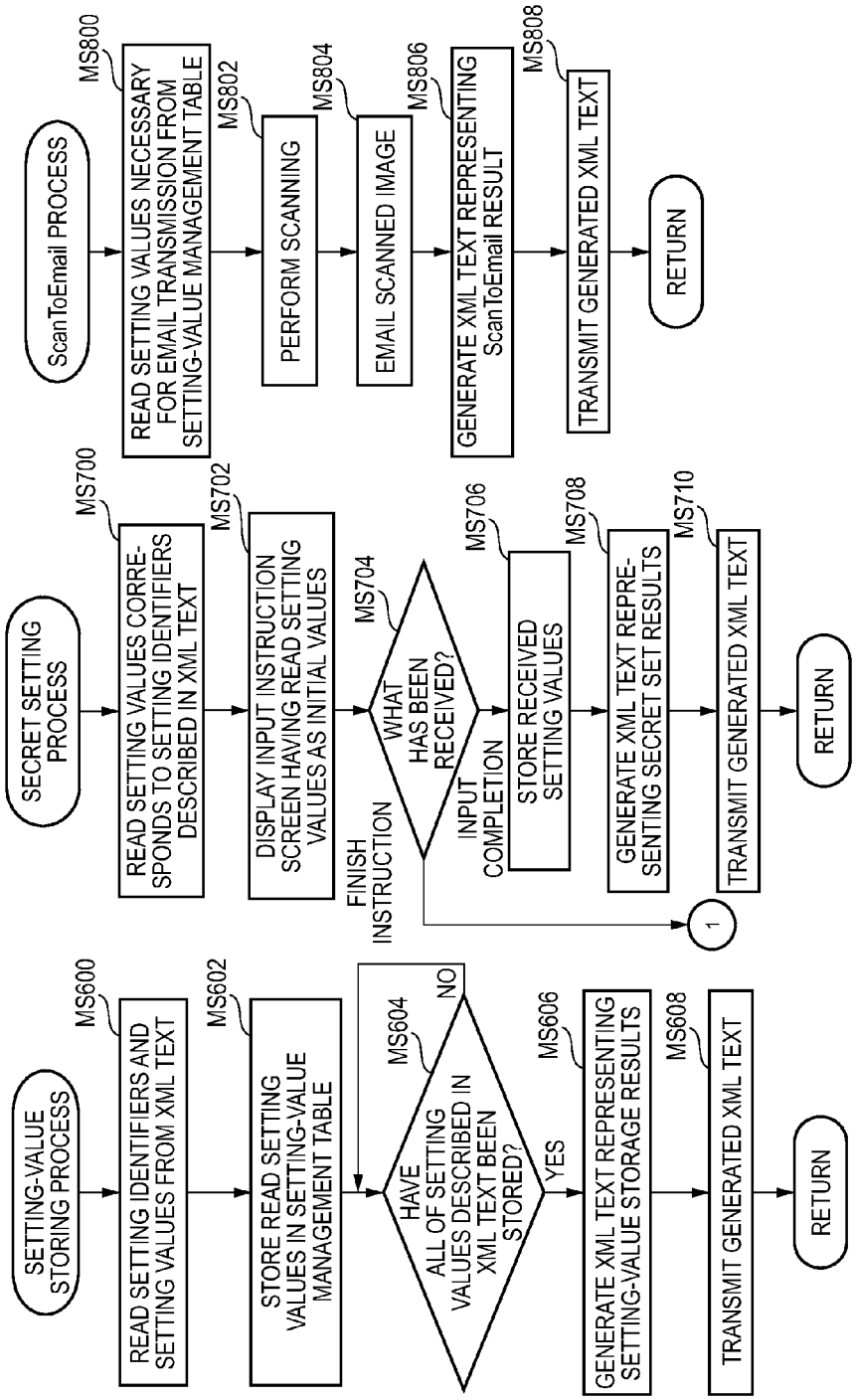

The MFP 100 performs a process shown in FIG. 9F, in accordance with the setting-value storing module 102e. In STEP MS606 of FIG. 9F, the MFP 100 generates an XML text which describes contents shown in FIG. 5C.

The MFP 100 performs a process shown in FIG. 9G, in accordance with the secret setting module 102f. In STEP MS708 of FIG. 9G, the MFP 100 generates an XML text which describes contents shown in FIG. 5D.

The MFP 100 performs a process shown in FIG. 9H, in accordance with the ScanToEmail module 102g. In STEP MS806 of FIG. 9H, the MFP 100 generates an XML text which describes contents shown in FIG. 5E.

As shown in FIGS. 5A to 5E, an XML text to be transmitted from the MFP 100 to the instruction device 200 describes a command result, and command result parameters.

The RAM 103 is a volatile memory that temporarily stores information necessary for processes of the CPU 101. The RAM 103 includes a temporarily storing area 103a for temporarily storing reception XMLs, and the details will be described below. The flash memory 104 is a rewritable non-volatile memory. The flash memory 104 stores the setting-value management table 104a for managing data necessary for the MFP 100 to perform various processes, and the details will be described below.

The setting-value management table 104a shown in FIG. 4 stores setting values set for individual setting items related to various processes of the MFP 100. Setting identifiers are unique numeral values each of which is assigned to a corresponding one of a plurality of setting items. For example, the instruction device 200 uses a setting identifier to designate a specific item when instructing the MFP 100 to change the setting value of the specific item. An input format represents a data format when a setting value of each setting item is input. An input format 'TEXT' represents that a setting value is input in a text. An input format 'NUMERAL VALUE' represents that a setting value is numerically input. An input format 'SELECTION' represents that a numeral value or a text selected from a plurality of selection candidates is input. Incidentally, in FIG. 4, the setting values of setting items 'SMTP SERVER', 'EMAIL ADDRESS', 'ACCOUNT NAME', and 'PASSWORD' are represented by ⊚ ⊚, ○ ○, ∆ ∆, x x; however, they are stored in the text format.

The network I/F 105 is a unit for performing communication with other apparatuses through the Internet 500, and known network hardware is an example of the network I/F 105. The printing unit 106 is a unit for printing images. The reading unit 107 is a unit for performing scanning. Scanning is performed in accordance with setting values of setting items which is stored in the setting-value management table 104*a* in association with scanning. The display unit 109 is a liquid crystal display and is configured to perform display in accordance with an input signal from the CPU 101.

The input unit 108 is composed of a touch panel and is provided to overlap a display surface of the display unit 109. The touch panel is an electrostatic capacitance type. If a user touches the touch panel, a signal corresponding to the touched area is input to the CPU 101.

(Configuration of Instruction Device 200)

Figure 3:
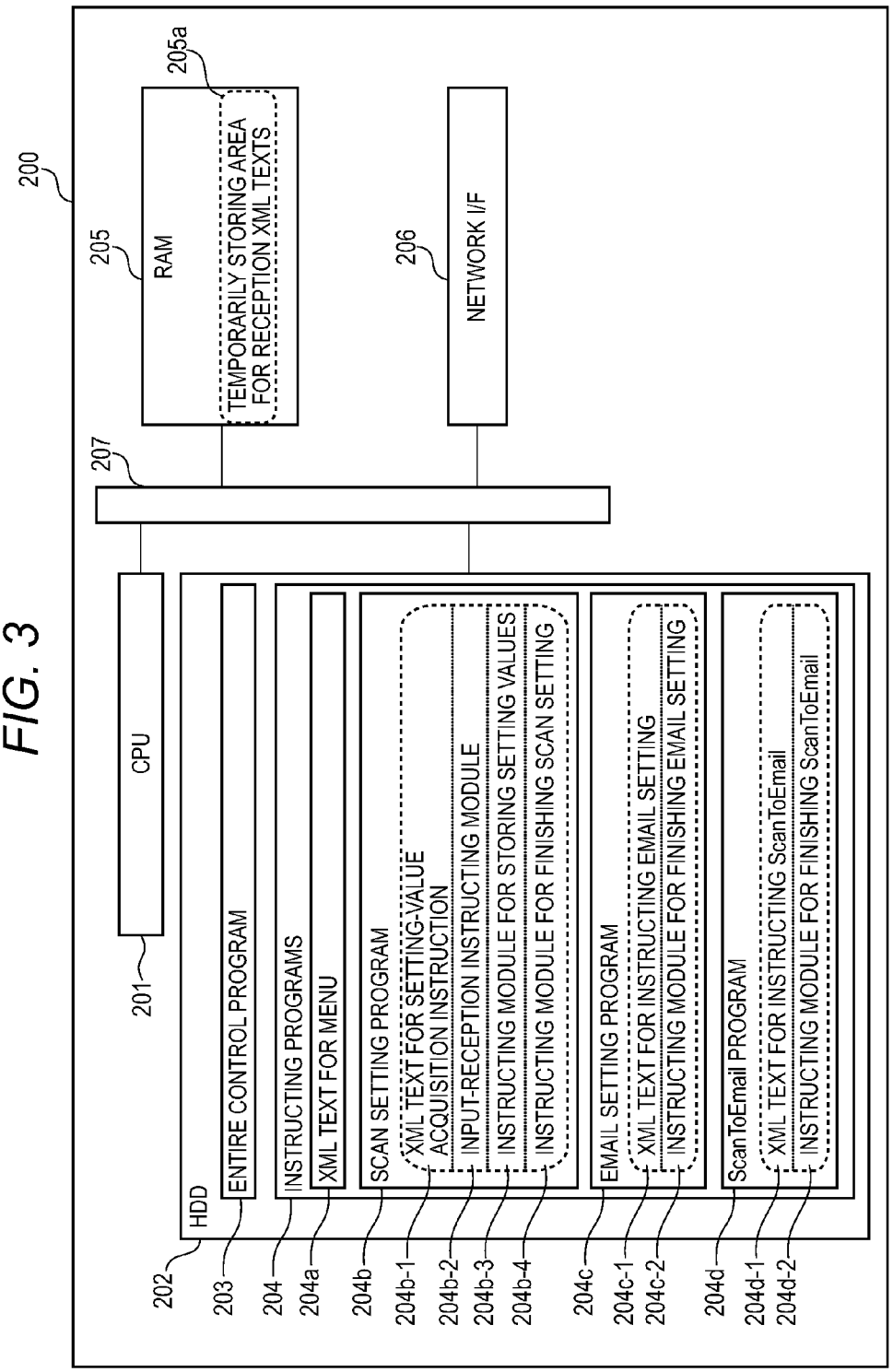
FIG. 3 is a block diagram illustrating an example of a hardware configuration of an instruction device.

The instruction device 200 shown in FIG. 3 includes a CPU 201, a hard disk drive (HDD) 202, a RAM 205, and a network I/F 206, as hardware components. These hardware components are connected to one another by bus lines 207.

The CPU 201 performs operations in accordance with programs stored in the HDD 202 and performs instructions on the individual hardware components. The HDD 202 stores an entire control program 203 for controlling an operation of the instruction device 200 and instructing programs 204 including XML texts and a plurality of programs for transmitting the XML texts to the MFP 100. The instructing programs 204 includes an XML text 204*a* for a menu shown in FIG. 6A, a scan setting program 204*b*, an email setting program 204*c*, and a ScanToEmail program 204*d*. The scan setting program 204*b*, the email setting program 204*c*, and the ScanToEmail program include some programs and XML texts.

The scan setting program 204*b* includes an XML text 204*b*-1 for a setting-value acquisition instruction shown in FIG. 6B, an input-reception instructing module 204*b*-2, an instructing module 204*b*-3 for storing setting values, and an instructing module 204*b*-4 for finishing scan setting.

Figure 10B:
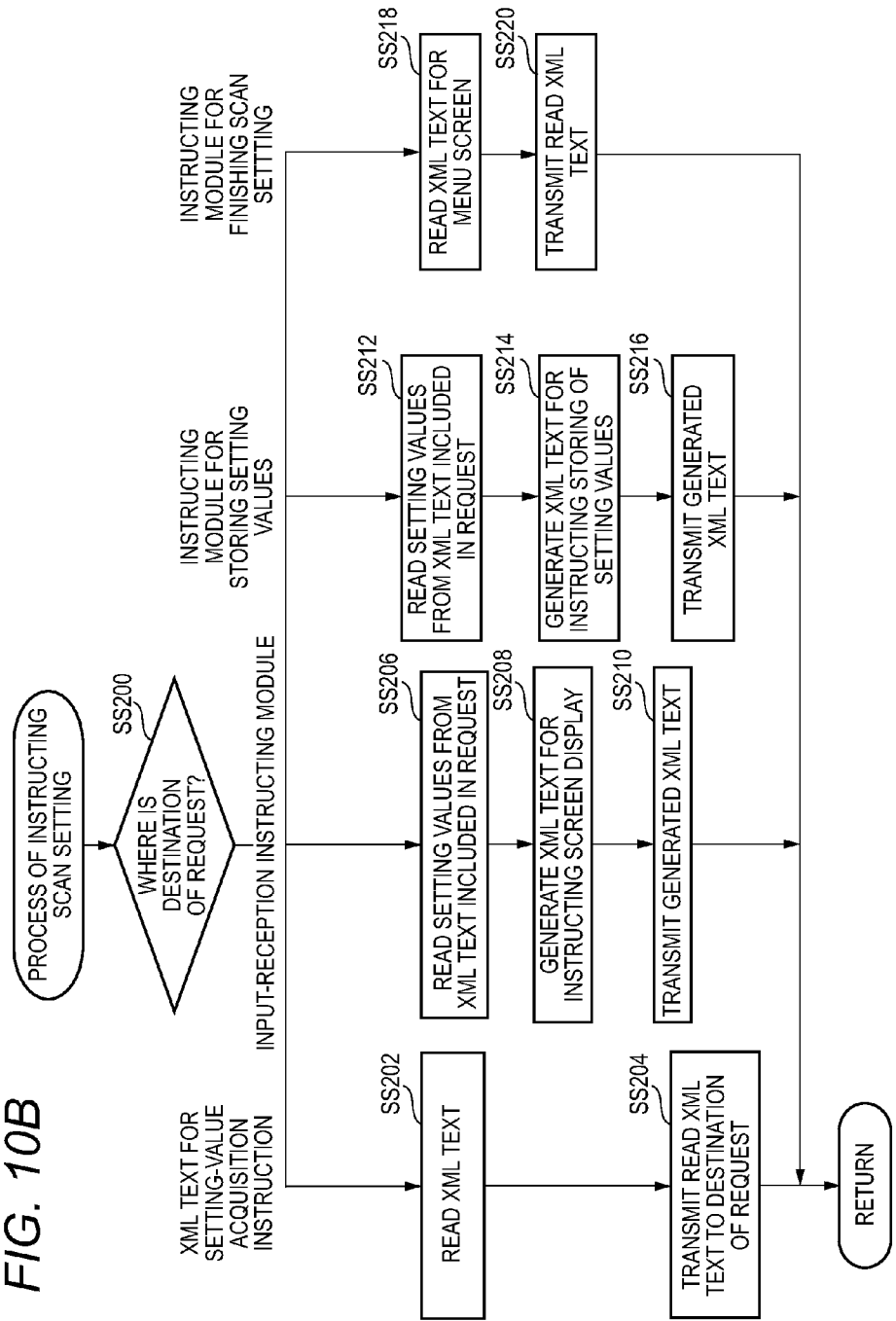
FIG. 10B is a flow chart illustrating an instruction process for scan setting performed by the instruction device.

The instruction device 200 performs processes of STEP SS206 to STEP SS210 of FIG. 10B in accordance with the input-reception instructing module 204*b*-2. In STEP SS208, the instruction device 200 generates an XML text which describes contents shown in FIG. 6C.

The instruction device 200 performs processes of STEP SS212 to STEP SS216 of FIG. 10B in accordance with the instructing module 204*b*-3 for storing setting values. In STEP SS214, the instruction device 200 generates an XML text which describes contents shown in FIG. 6D.

The instruction device 200 performs processes of STEP SS218 and STEP SS220 of FIG. 10B in accordance with the instructing module 204*b*-4 for finishing scan setting.

The email setting program 204*c* includes an XML text 204*c*-1 for instructing email setting as shown in FIG. 6E, and an instructing module 204*c*-2 for finishing email setting.

The instruction device 200 performs processes of STEP SS306 and STEP SS308 of FIG. 10C, in accordance with the instructing module 204*c*-2 for finishing email setting.

The ScanToEmail program 204*d* includes an XML text 204*d*-1 for instructing ScanToEmail as shown in FIG. 6F, and an instructing module 204*d*-2 for finishing ScanToEmail.

The instruction device 200 performs processes of STEP SS406 and STEP SS408 of FIG. 10D in accordance with the instructing module 204*d*-2 for finishing ScanToEmail.

As shown in FIGS. 6A to 6F, XML texts which are transmitted from the instruction device 200 to the MFP 100 describe commands, command parameters, and reply destination URLs.

The instructing programs 204 include XML texts and the contents and URLs of program modules, as shown in FIG. 7. It can be seen that an XML text and a module constituting the scan setting program 204*b* are stored in a lower hierarchy of 'http://XYZ/scan-option'. Similarly, it is seen that an XML text and a module constituting the email setting program 204*c* are stored in a lower hierarchy of 'http://XYZ/email-option'. Similarly, it is seen that an XML text and a module constituting the ScanToEmail program are stored in a lower hierarchy of 'http://XYZ/scantoemail'. The instruction device have the URL 102*h* which is stored in the ROM 102 of the MFP 100 and is 'http://XYZ/menu.xml' representing an URL of an area storing the XML text 204*a* for the menu.

The RAM 205 is a volatile memory which temporarily stores data necessary for processes of the CPU 201. The RAM 205 includes a temporarily storing area 205*a* for reception XML texts, which is an area for temporarily stores reception XML texts from the MFP 100.

(Operation of MFP 100)

[Entire Process of MFP 100]

Upon a power supply of the MFP 100 is turned on, an entire process of the MFP shown in FIG. 9A starts. In STEP MS100, the CPU 101 receives instructions for instructing various processes, from the input unit 108. Then, in STEP MS102, the CPU 101 determines whether an instruction received in STEP MS100 is for a cooperation process with the instruction device 200. If the CPU 101 determines that the received instruction is for a cooperation process (Yes in STEP MS102), the CPU 101 proceeds to STEP MS104. On the other hand, if the CPU 101 determines that the received instruction is not for a cooperation process (No in STEP MS102), the CPU 101 proceeds to STEP MS108.

In STEP MS108, the CPU 101 performs the process according to the instruction received in STEP MS100. Examples of that process include a copy process, a scanning process, and the like. These processes are well known, and thus will not be described.

In STEP MS104, the CPU 101 controls the network I/F 105 such that a request having the URL 102*h* of the instruction device (that is, the URL of the XML text 204*a* for the menu) as a destination is transmitted to the instruction device 200. The request which is transmitted to the instruction device 200 is implemented by a GET method of HTTP. In the following processes, it is assumed that, among requests which the MFP 100 transmits to the instruction device 200, requests without attached XML texts are implemented by the GET method of the HTTP.

Next, the CPU 101 proceeds to STEP MS106. Incidentally, STEP MS106 is implemented by a subroutine, and the details will be described below with reference to FIG. 9B.

[Cooperation Process with Instruction Device 200]

As shown in FIG. 9B, the MFP 100 stands ready to receive an XML text (one example of an instruction request) transmitted from the instruction device 200. If the CPU 101 determines that an XML text is received in STEP MS200, the CPU 101 stores the XML text in the temporarily storing area 103*a* for reception XML texts and proceeds to STEP MS202.

In STEP MS202, the CPU 101 analyzes the XML text stored in the temporarily storing area 103a for reception XML texts, and determines whether a command described in the XML text is a user interface (hereinafter, referred to as a UI) display command. If the CPU 101 determines that the command described in the XML text is a UI display command (Yes in STEP MS202), the CPU 101 proceeds to a UI display process of STEP MS204. On the other hand, if the CPU 101 determines that the command described in the XML text is not a UI display command (No in STEP MS202), the CPU 101 proceeds to STEP MS206.

In STEP MS206, the CPU 101 determines whether the command described in the XML text stored in the temporarily storing area 103a for reception XML texts is a setting-value acquiring command. If the CPU 101 determines that the command described in the XML text is a setting-value acquiring command (Yes in STEP MS206), the CPU 101 proceeds to a setting-value acquiring process of STEP MS208. On the other hand, if the CPU 101 determines that the command described in the XML text is not a setting-value acquiring command (No in STEP MS206), the CPU 101 proceeds to STEP MS210.

In STEP MS210, the CPU 101 determines whether the command described in the XML text stored in the temporarily storing area 103a for reception XML texts is a screen display command. If the CPU 101 determines that the command described in the XML text is a screen display command (Yes in STEP MS210), the CPU 101 proceeds to a screen display process of STEP MS212. On the other hand, if the CPU 101 determines that the command described in the XML text is not a screen display command (No in STEP MS210), the CPU 101 proceeds to STEP MS214.

In STEP MS214, the CPU 101 determines whether the command described in the XML text stored in the temporarily storing area 103a for reception XML texts is a setting-value storing command. If the CPU 101 determines that the command described in the XML text is a setting-value storing command (Yes in STEP MS214), the CPU 101 proceeds to a setting-value storing process of STEP MS216. On the other hand, if the CPU 101 determines that the command described in the XML text is not a setting-value storing command (No in STEP MS214), the CPU 101 proceeds to STEP MS218.

In STEP MS218, the CPU 101 determines whether the command described in the XML text stored in the temporarily storing area 103a for reception XML texts is a secret setting command. If the CPU 101 determines that the command described in the XML text is a secret setting command (Yes in STEP MS218), the CPU 101 proceeds to a secret setting process of STEP MS220. On the other hand, if the CPU 101 determines that the command described in the XML text is not a secret setting command (No in STEP MS218), the CPU 101 proceeds to STEP MS222.

In STEP MS222, the CPU 101 determines whether the command described in the XML text stored in the temporarily storing area 103a for reception XML texts is a ScanToEmail command. If the CPU 101 determines that the command described in the XML text is a ScanToEmail command (Yes in STEP MS222), the CPU 101 proceeds to a ScanToEmail process of STEP MS224. On the other hand, if the CPU 101 determines that the command described in the XML text is not a ScanToEmail command (No in STEP MS222), the CPU 101 proceeds to another process of STEP MS226. Incidentally, in the present exemplary embodiment, the ScanToEmail process represents a process in which the MFP 100 attaches scan data acquired by scanning of the reading unit 107 to an email, and transmits the email to the SMTP server 300.

The processes of STEP MS204, STEP MS208, STEP MS212, STEP MS216, STEP MS220, and STEP MS224 are implemented by subroutines, and the details will be described with reference to FIGS. 9C to 9H. Incidentally, other process of the STEP MS227 will not be described in detail in the present exemplary embodiment.

[UI Display Process]

The XML text 204a for the menu shown in FIG. 6A is transmitted from the instruction device 200 to the MFP 100 and is stored in the temporarily storing area 103a for reception XML texts. As shown in FIG. 9C, in STEP MS300, the CPU 101 reads a title, and icon names of command parameters from the XML text stored in the temporarily storing area 103a for reception XML texts. Further, in STEP MS300, the CPU 101 makes the display unit 109 display a screen based on the read tile and command parameters.

As shown in FIG. 8A, on the screen displayed on the display unit 109, the title 'MENU' is provided in an upper portion thereof, and instruction icons 120 are provided at a center portion thereof. Further, at an area on the right side from the center, a finish icon 130 for instructing finish of the cooperation process with the instruction device 200.

FIG. 8A shows an example of a screen which is displayed if the MFP 100 receives the XML text (describing 'MENU' as a title, and 'SCAN SETTING', 'EMAIL SETTING' and 'ScanToEmail' as command parameters) shown in FIG. 6A. If the MFP 100 receives an XML text including a title and icon names different from those of the XML text shown in FIG. 6A, naturally, a different screen will be displayed.

In STEP MS302, the CPU 101 determines which of the instruction icons 120 and the finish icon 130 has been touched. In a case where the finish icon 130 has been touched ('FINISH ICON' in STEP MS302), the CPU 101 determines that a finish instruction has been received, and the CPU 101 finishes the entire process of the MFP 100. On the other hand, in a case where an instruction icon 120 has been touched ('INSTRUCTION ICON' in STEP MS302), the CPU 101 controls the network I/F 105 such that a request having a reply destination URL as a destination is transmitted. The reply destination URL of the transmitted request is the reply destination URL described in the XML text in a pair with a command parameter used for displaying the touched instruction icon 120. For example, as shown in FIG. 6A, if an icon name of a command parameter is 'SCAN SETTING', a reply destination URL paired with the icon name 'SCAN SETTING' is 'http//XYZ/scan-option/star'. Next, the CPU 101 returns to the cooperation process with the instruction device shown in FIG. 9B.

[Setting-Value Acquiring Process]

The XML text 204b-1 for a setting-value acquisition instruction shown in FIG. 6B is transmitted from the instruction device 200 to the MFP 100, and is stored in the temporarily storing area 103a for reception XML texts. As shown in FIG. 9D, the CPU 101 reads a setting identifier of a command parameter from the XML text stored in the temporarily storing area 103a for reception XML texts. Next, in STEP MS400, the CPU 101 reads a setting value of a setting item having the read setting identifier, from the setting-value management table 104a.

If the CPU 101 determines that the reading of the setting value of the setting item having the read setting identifier described in the XML text stored in the temporarily storing area 103a for reception XML texts has been completed (Yes in STEP MS402), the CPU 101 proceeds to STEP MS404. On the other hand, if the CPU 101 determines that the reading has not been completed (No in STEP MS402), the CPU 101 repeats STEP MS402.

In STEP MS404, the CPU 101 generates an XML text which describes a setting-value acquisition result as a command result, and describes the setting identifier and the setting value read in STEP MS400 as command parameters in association with each other, as shown in FIG. 5A. Then, the CPU 101 proceeds to STEP MS406.

In STEP MS406, the CPU 101 controls the network I/F 105 to transmit a request having, as a destination, the reply destination URL shown in FIG. 6B described in the XML text stored in the temporarily storing area 103a for reception XML texts. The request which the CPU 101 makes the network I/F 105 transmit in STEP MS406 includes the XML text generated in STEP MS404. Next, the CPU 101 returns to the cooperation process with the instruction device shown in FIG. 9B. The request to be transmitted to the instruction device 200 is implemented by a POST method of the HTTP. In the following processes, it is assumed that, among requests to be transmitted from the MFP 100 to the instruction device 200, requests with attached XML texts are implemented by the POST method of the HTTP.

[Screen Display Process]

Each XML text including a screen display command describes any one of 'SELECTION' and 'INPUT' as a command detail, in addition to a title, command parameters, and a reply destination URL. In an XML text describing 'INPUT' as the command detail, a command parameter is composed of two items of 'ITEM NAME' and 'INITIAL VALUE'. On the other hand, in an XML text describing 'SELECTION' as the command detail, a command parameter is composed of three items of 'ITEM NAME', 'INITIAL VALUE', and 'LIST'. In the present exemplary embodiment, a case where the command detail described in the XML text stored in the temporarily storing area 103a for reception XML texts is 'SELECTION' as shown in FIG. 6C will be described.

An XML text for instructing screen display as shown in FIG. 6C is transmitted from the instruction device 200 to the MFP 100, and is stored in the temporarily storing area 103a for reception XML texts. As shown in FIG. 9E, in STEP MS500, the CPU 101 reads a title, and item names, initial values, and lists of command parameters, from the XML text stored in the temporarily storing area 103a for reception XML texts.

Next, in STEP MS502, the CPU 101 makes the display unit 109 display a screen for receiving input of setting values, on the basis of the read title, item names, initial values, and lists.

FIG. 8B shows an example of a screen which the CPU 101 makes the display unit 109 in STEP MS502 in a case where the MFP 100 receives the XML text shown in FIG. 6C in STEP MS200. On the screen displayed on the display unit 109, the title 'SCAN SETTING' is provided at an upper portion thereof. Further, each item name and an input value icon 121 representing a value selected for the corresponding item name are provided side by side. A value represented by an input value icon 121 provided next to each item name is an initial value described in a pair with the corresponding item name in the XML text. Furthermore, at an area on the right side from the center, a finish icon 130 for instructing finish of the cooperation process with the instruction device, and an OK icon 131 for accepting displayed setting contents are provided.

FIG. 8B shows an example of a screen which is displayed on the display unit 109 in a case where the MFP 100 receives the XML text (which describes 'SCAN SETTING' as a title, and 'RESOLUTION FOR SCANNING', 'SHEET SIZE FOR SCANNING', and 'DATA FORMAT FOR SCANNING' as item names) shown in FIG. 6C. In a case where the MFP 100 receives an XML text describing a title and item names different from those of the XML text shown in FIG. 6C, naturally, a different screen will be displayed.

If the input value icon 121 is touched on the screen of FIG. 8B, a transition to a screen where candidate value icons 122 representing candidate values for a selection value are spread is performed. Incidentally, the values represented by the candidate value icons 122 correspond to a plurality of values shown in the corresponding list described in the XML text.

If any one of the candidate value icons 122 is touched, the touched candidate value icon 122 is highlighted as shown in FIG. 8C. After any one of the candidate value icons 122 highlighted, if the OK icon 131 is touched with, the spread candidate value icons 122 are folded. Immediately before the OK icon 131 is touched, the value of the input value icon 121 changes to the value of the highlighted candidate value icon. FIG. 8D shows an example of a screen in a case where the OK icon 131 is touched in the screen of FIG. 8C.

After the candidate value icons 122 are folded, that is, in states shown in FIGS. 8B and 8D, if the OK icon 131 is touched, the CPU 101 determines that input value reception has been completed ('INPUT COMPLETION' in STEP MS504), the CPU 101 proceeds to STEP MS506. On the other hand, if the finish icon 130 is touched ('FINISH INSTRUCTION' in STEP MS504), the CPU 101 finishes the cooperation process with the instruction device.

In STEP MS506, the CPU 101 generates an XML text, in which 'SCREEN DISPLAY RESULT' is described as a command result and the values of the input value icons 121 are described as command result parameters, as shown in FIG. 5B.

In the STEP MS508, the CPU 101 controls the network I/F 105, such that a request having, as a destination, the reply destination URL described as shown in FIG. 6C in the XML text stored in the temporarily storing area 103a for reception XML texts is transmitted. The request which the CPU 101 makes the network I/F 105 transmit in STEP MS508 includes the XML text generated in STEP MS506. Then, the CPU 101 returns to the cooperation process with the instruction device shown in FIG. 9B.

[Setting-Value Storing Process]

An XML text for instructing storing of setting values as shown in FIG. 6D is transmitted from the instruction device 200 to the MFP 100, and is stored in the temporarily storing area 103a for reception XML texts. As shown in FIG. 9F, in STEP MS600, the CPU 101 reads pairs of setting identifiers and setting values, from the XML text stored in the temporarily storing area 103a for reception XML texts. Then, the CPU 101 proceeds to STEP MS602. In STEP MS602, the CPU 101 stores each setting value read in STEP MS600, as a setting value for a setting item having the setting identifier paired with the corresponding setting value, in the setting-value management table 104a. Then, the CPU 101 proceeds to STEP MS604.

In STEP MS604, the CPU 101 determines whether all of the setting values described in the XML text have been stored in the setting-value management table 104a. If the CPU 101 determines that all of the setting values have been stored (Yes in STEP MS604), the CPU 101 proceeds to STEP MS606. On the other hand, if the CPU 101 determines that all of the setting values have not been stored (No in STEP MS604), the CPU 101 repeats STEP MS604.

In STEP MS606, the CPU 101 generates an XML text which describes 'SETTING-VALUE STORAGE RESULT' as a command display result, and describes the setting identifiers assigned to the setting items having the setting values stored in STEP MS602, and set results ('OK' in the present exemplary embodiment) as command result parameters, as shown in FIG. 5C.

In STEP MS608, the CPU 101 controls the network I/F 105, such that a request having, as a destination, the reply destination URL described as shown in FIG. 6D in the XML text stored in the temporarily storing area 103a for reception XML texts is transmitted. The request which the CPU 101 makes the network I/F 105 transmit in STEP MS608 includes the XML text generated in STEP MS606. Then, the CPU 101 returns to the cooperation process with the instruction device shown in FIG. 9B. The destination of the request which the CPU 101 makes the network I/F 105 transmit in STEP MS608 is the instructing module 204b-4 for finishing scan setting. The instructing module 204b-4 for finishing scan setting is a module for transmitting the XML text 204a for the menu to the MFP 100 as shown in STEP SS218 and STEP SS220 of FIG. 10B. In other words, in STEP MS608, the MFP 100 requests an instruction for the next process (here, menu screen display), in addition to transmit the XML text representing the setting-value storage result to the instruction device 200.

[Secret Setting Process]

An XML text for instructing secret setting as shown in FIG. 6E is transmitted from the instruction device 200 to the MFP 100, and is stored in the temporarily storing area 103a for reception XML texts. As shown in FIG. 9G, in STEP MS700, the CPU 101 reads item names and setting identifiers from the XML text stored in the temporarily storing area 103a for reception XML texts. Further, in STEP MS700, the CPU 101 reads the setting values of the setting items having the read setting identifiers, from the setting-value management table 104a. Then, the CPU 101 proceeds to STEP MS702.

In STEP MS702, the CPU 101 makes the display unit 109 display a screen for receiving input of setting values on the basis of the setting items and the setting values read in STEP MS700.

FIGS. 8E and 8F show examples of a screen which the CPU 101 makes the display unit 109 display in STEP MS702 in a case where the MFP 100 receives the XML text shown in FIG. 6E in STEP MS200. On the screen displayed on the display unit 109, the title 'EMAIL SETTING' is provided at an upper portion thereof. Further, the setting items having the setting identifiers described in the XML text stored in the temporarily storing area 103a for reception XML texts, and input value icons 121 representing selected or input for the individual setting identifiers are provided side by side on the screen on the display unit 109. The values represented by the input value icons 121 provided next to the individual setting items are the setting values of the individual setting items read in STEP MS700. Furthermore, at an area on the right side from the center, a finish icon 130 for instructing finish of the cooperation process with the instruction device, an OK icon 131, an icon 132 for scrolling down, and an icon 133 for scrolling up are provided.

FIGS. 8E and 8F show examples of the screen which is displayed on the display unit 109 in the case where the MFP 100 receives the XML text (which describes 'EMAIL SETTING' as the title, and 'EMAIL SERVER', 'SERVER PORT', 'Auth. For SMTP', 'EMAIL ADDRESS', 'ACCOUNT NAME' and 'PASSWORD' as the item names) shown in FIG. 6E. In a case where the MFP 100 receives an XML text describing a title and item names different from those of the XML text shown in FIG. 6E, naturally, a different screen will be displayed.

If an input value icon 121 is touched on the screen shown in FIG. 8E or 8F, a transition to a screen for inputting setting values is performed. In a case where the input format for the setting item of the touched input value icon 121 is 'SELECTION' in the setting-value management table 104a, the screen for inputting setting values becomes a state in which candidate value icons (not shown) representing candidate values for a selection value are spread on the screen. The values represented by the candidate value icons correspond to a plurality of values shown in the list described in a pair with the setting identifier in the XML text. If any one candidate value icon is touched on the screen for inputting a setting value, only the touched icon is highlighted.

Meanwhile, in a case where the input format for the setting item of the touched input value icon 121 is 'NUMERAL VALUE' or 'TEXT' in the setting-value management table 104a, the screen for inputting setting values becomes a state in which a software keyboard (not shown) is spread on the set screen. Then, the software keys of the software keyboard can be touched such that a text or a numeral value is input as an input value.

If the OK icon 131 is touched on the screen for inputting setting values, the spread candidate value icons or software keyboard is folded. After the candidate value icons or software keyboard is folded, if the OK icon 131 is touched, the CPU 101 determines that the input reception has been completed ('INPUT COMPLETION' in STEP MS704), and proceeds to STEP MS706. On the other hand, if the finish icon 130 is touched ('FINISH INSTRUCTION' in STEP MS704), the CPU 101 finishes the cooperation process with the instruction device.

In STEP MS706, the CPU 101 stores the value of the input value icon 121 in the setting-value management table 104a. Then, the CPU 101 proceeds to STEP MS708.

In STEP MS708, the CPU 101 generates an XML text which describes 'SECRET SET RESULT' as a command result, and describes the setting identifiers of the individual setting items, and set results ('OK' in the present exemplary embodiment) as command result parameters, as shown in FIG. 5D. Then, the CPU 101 proceeds to STEP MS710.

In STEP MS710, the CPU 101 controls the network I/F 105, such that a request having, as a destination, the reply destination URL described as shown in FIG. 6E in the XML text stored in the temporarily storing area 103a for reception XML texts is transmitted. The request which the CPU 101 makes the network I/F 105 transmit in STEP MS710 includes the XML text generated in STEP MS708. Then, the CPU 101 returns to the cooperation process with the instruction device shown in FIG. 9B. The destination of the request which the CPU 101 makes the network I/F 105 transmit in STEP MS710 is the instructing module 204c-2 for finishing email setting. The instructing module 204c-2 for finishing email setting is a module for transmitting the XML text 204a for the menu to the MFP 100 as shown in STEP SS306 and STEP SS308 of FIG. 10C. In other words, in STEP MS710, the MFP 100 requests an instruction for the next process (here, menu screen display), in addition to transmit the XML text representing the secret set result to the instruction device 200.

[ScanToEmail Process]

An XML text for instructing ScanToEmail as shown in FIG. 6F is transmitted from the instruction device 200 to the MFP 100, and is stored in the temporarily storing area 103a for reception XML texts. As shown in FIG. 9H, in STEP MS800, the CPU 101 reads the setting values of setting items necessary for email transmission, from the XML text stored in the temporarily storing area 103a for reception XML texts. In the present exemplary embodiment, the setting values necessary for email transmission are the setting values of 'SMTP SERVER', 'SERVER PORT', 'Auth. For SMTP', 'EMAIL ADDRESS', 'ACCOUNT NAME' and 'PASSWORD'. Incidentally, the setting values of the 'ACCOUNT NAME' and 'PASSWORD' are transmitted to the SMTP server 300 (as one example of user-specific information transmitted to a server), prior to the email transmission, for authenticating a sender of the email. Next, the CPU 101 proceeds to STEP MS802.

In STEP MS802, the CPU 101 controls the reading unit 107 such that the reading unit 107 performs scanning. In STEP MS802, the scanning is performed in accordance with the setting values of a resolution for scanning, a sheet size for scanning, and a data format for scanning, stored in the setting-value management table 104a. Then, the CPU 101 proceeds to STEP MS804.

In STEP MS804, the CPU 101 controls the network I/F 105 such that an email having, as a destination, the setting value of 'EMAIL ADDRESS' read in STEP MS800 is transmitted to the SMTP server 300 specified by the setting value of 'SMTP SERVER' read in STEP MS800. The transmission email includes the scan data obtained by the scanning of STEP MS802. Further, the transmission email includes the 'EMAIL ADDRESS' (as one example of user-specific information transmitted to the server). Next, the CPU 101 proceeds to STEP MS806.

In STEP MS806, the CPU 101 generates an XML text which describes 'ScanToEmail RESULT' as a command display result, and a performance result ('OK' in the present exemplary embodiment) as a command result parameter, as shown in FIG. 5E. Then, the CPU 101 proceeds to STEP MS808.

In STEP MS808, the CPU 101 controls the network I/F 105 such that a request having, as a destination, the reply destination URL described as shown in FIG. 6F in the XML text stored in the temporarily storing area 103a for reception XML texts is transmitted. The request which the CPU 101 makes the network I/F 105 transmit in STEP MS808 includes the XML text generated in STEP MS806. Next, the CPU 101 returns to the cooperation process with the instruction device shown in FIG. 9B. The destination of the request which the CPU 101 makes the network I/F 105 transmit in STEP MS808 is the instructing module 204d-2 for finishing ScanToEmail. The instructing module 204d-2 for finishing ScanToEmail is a module for transmitting the XML text 204a for the menu to the MFP 100 as shown in STEP SS406 and STEP SS408 of FIG. 10D. In other words, in STEP MS808, the MFP 100 requests an instruction for the next process (here, menu screen display), in addition to transmit the XML text representing the ScanToEmail result to the instruction device 200.

(Operation of Instruction Device 200)

[Cooperation Process with MFP 100]

As shown in FIG. 10A, the CPU 201 stands ready to receive a request, which is implemented by the GET method of the HTTP, from the MFP 100. Upon receiving a request in STEP SS100, the CPU 201 proceeds to STEP SS102. In a case where the received request includes an attached XML text, the CPU 201 stores the attached XML text in the temporarily storing area 205a for reception XML texts.

In STEP SS102, the CPU 201 determines which XML text or module has a URI designated as the destination of the request. If the CPU 201 determines that the designated URL is the URL of the XML text 204a for the menu ('MENU' in STEP SS102), the CPU 201 proceeds to STEP SS104.

If the CPU 201 determines that the designated URL is the URL of any one of the XML text and the module constituting the scan setting program 204b ('SCAN SETTING PROGRAM' in STEP SS102), the CPU 201 proceeds to STEP SS106. Incidentally, STEP SS106 is implemented by a subroutine, and the details will be described with reference to FIG. 10B.

If the CPU 201 determines that the designated URL is the URL of any one of the XML text and the module constituting the email setting program 204c ('EMAIL SETTING PROGRAM' in STEP SS102), the CPU 201 proceeds to STEP SS108. Incidentally, STEP SS108 is implemented by a subroutine, and the details will be described with reference to FIG. 10C.

If the CPU 201 determines that the designated URL is the URL of any one of the XML text and the module constituting the ScanToEmail program 204d ('ScanToEmail PROGRAM' in STEP SS102), the CPU 201 proceeds to STEP SS110. Incidentally, STEP SS110 is implemented by a subroutine, and the details will be described with reference to FIG. 10D.

In STEP SS104, the CPU 201 reads the XML text 204a for the menu. Next, in STEP SS104, the CPU 201 transmits the read XML text 204a for the menu to the MFP 100 which is the source of the request. Then, the CPU 201 proceeds to STEP SS100.

[Process Based on Scan Setting Program]

As shown in FIG. 10B, in STEP SS200, the CPU 201 determines which of the XML text and the module constituting the scan setting program has the URL designated as the destination of the request.

If the CPU 201 determines that the designated URL is the URL of the XML text 204b-1 for a setting-value acquisition instruction ('XML TEXT FOR SETTING-VALUE ACQUISITION INSTRUCTION' in STEP SS200), the CPU 201 proceeds to STEP SS202. If the CPU 201 determines that the designated URL is the URL of the input-reception instructing module 204b-2 ('INPUT-RECEPTION INSTRUCTING MODULE' in STEP SS200), the CPU 201 proceeds to STEP SS206. If the CPU 201 determines that the designated URL is the URL of the instructing module 204b-3 for storing setting values ('INSTRUCTING MODULE FOR STORING SETTING VALUES' in STEP SS200), the CPU 201 proceeds to STEP SS212. If the CPU 201 determines that the designated URL is the URL of the instructing module 204b-4 for finishing scan setting ('INSTRUCTING MODULE FOR FINISHING SCAN SETTING' in STEP SS200), the CPU 201 proceeds to STEP SS218.

In STEP SS202, the CPU 201 reads the XML text 204b-1 for a setting-value acquisition instruction. Next, in STEP SS204, the CPU 201 transmits the read XML text to the MFP 100 which is the source of the request. Then, the CPU 201 returns to the entire process of the instruction device 200 shown in FIG. 10A.

In STEP SS206, the CPU 201 reads the setting values from the XML text stored in the temporarily storing area 205a for reception XML texts. Then, the CPU 201 proceeds to STEP SS208. In STEP SS208, the CPU 201 generates an XML text for instructing screen display using the setting values read in STEP SS206. Then, the CPU 201 proceeds to STEP SS210. In STEP SS210, the CPU 201 transmits the generated XML text to the MFP 100 which is the source of the request. Then, the CPU 201 returns to the entire process of the instruction device 200 shown in FIG. 10A.

In STEP SS212, the CPU 201 reads the setting values of the command parameters from the XML text stored in the temporarily storing area 205a for reception XML texts. Then, the CPU 201 proceeds to STEP SS214. In STEP SS214, the CPU 201 generates an XML text, which describes the setting identifiers of the setting-value management table 104a as command parameters, and describes the setting values of the command parameters read in STEP SS212, in pairs with the setting identifiers. Then, the CPU 201 proceeds to STEP SS216. In STEP SS216, the CPU 201 transmits the XML text generated in STEP SS214, to the MFP 100 which is the source of the request. Then, the CPU 201 returns to the entire process of the instruction device 200 shown in FIG. 10A.

In STEP SS218, the CPU 201 reads the XML text 204a for the menu. Next, in STEP SS220, the CPU 101 transmits the XML text 204a to the MFP 100 which is the source of the request. Then, the CPU 201 returns to the entire process of the instruction device 200 shown in FIG. 10A.

[Process Based on Email Setting Program]

As shown in FIG. 10C, in STEP SS300, the CPU 201 determines which of the XML text and the module constituting the email setting program has the URL designated as the destination of the request. If the CPU 201 determines that the designated URL is the URL of the XML text 204c-1 for instructing email setting ('XML TEXT FOR INSTRUCTING EMAIL SETTING' in STEP SS300), the CPU 201 proceeds to STEP SS302. On the other hand, if the CPU 201 determines that the designated URL is the URL of the instructing module 204c-2 for finishing email setting ('INSTRUCTING MODULE FOR FINISHING EMAIL SETTING' in STEP SS300), the CPU 201 proceeds to STEP SS306.

In STEP SS302, the CPU 201 reads the XML text 204c-1 for instructing email setting. Next, in STEP SS304, the CPU 201 transmits the read XML text to the MFP 100 which is the source of the request. Then, the CPU 201 returns to the entire process of the instruction device 200 shown in FIG. 10A.

In STEP SS306, the CPU 201 reads the XML text 204a for the menu. Next, in STEP SS308, the CPU 201 transmits the XML text 204a to the MFP 100 which is the source of the request. Then, the CPU 201 returns to the entire process of the instruction device 200 shown in FIG. 10A.

[Process Based on ScanToEmail Program]

As shown in FIG. 10D, in the STEP SS400, the CPU 201 determines which of the XML text and the module constituting the ScanToEmail program has the URL designated as the destination of the request. If the CPU 201 determines that the designated URL is the URL of the XML text 204d-1 for instructing ScanToEmail ('XML TEXT FOR INSTRUCTING ScanToMail' in STEP SS400), the CPU 201 proceeds to STEP SS402. On the other hand, if the CPU 201 determines that the designated URL is the URL of the instructing module 204d-2 for finishing ScanToEmail ('INSTRUCTING MODULE FOR FINISHING ScanToMail' in STEP SS400), the CPU 201 proceeds to STEP SS406.

In STEP SS402, the CPU 201 reads the XML text 204d-1 for instructing ScanToEmail. Next, in STEP SS404, the CPU 201 transmits the read XML text to the MFP 100 which is the source of the request. Then, the CPU 201 returns to the entire process of the instruction device 200 shown in FIG. 10A.

In STEP SS406, the CPU 201 reads the XML text 204a for the menu. Next, in STEP SS408, the CPU 201 transmits the XML text 204a to the MFP 100 which is the source of the request. Then, the CPU 201 returns to the entire process of the instruction device 200 shown in FIG. 10A.

(Cooperation of MFP 100 and Instruction Device 200)

Hereinafter, process procedures of performing scan setting, email setting, and ScanToEmail in accordance with XML texts will be described with reference to FIGS. 11, 12, and 13.

[Scan Setting]

In STEP SQ101 of FIG. 11, a user touches the instruction icon 120 representing 'SCAN SETTING' on the screen shown in FIG. 8A. Then, in STEP SQ102, the MFP 100 transmits a request to a URL of an area of the instruction device 200 storing the XML text 204b-1 for a setting-value acquisition instruction.

In STEP SQ103, the instruction device 200 transmits the XML text 204b-1 for a setting-value acquisition instruction to the MFP 100. As shown in FIG. 6B, the XML text 204b-1 for a setting-value acquisition instruction describes the setting identifiers (that is, the setting identifiers 7, 8, and 9) assigned to the setting items related to scanning, among the setting identifiers stored in the setting-value management table 104a. Further, the XML text 204b-1 for a setting-value acquisition instruction describes the URL of the input-reception instructing module 204b-2 as shown in FIG. 6B, as the reply destination URL.

The MFP 100 reads the setting values of the setting items related to scanning, from the setting-value management table 104a. Further, in STEP SQ104, the MFP 100 generates an XML text which describes the read setting values as shown in FIG. 5A. In STEP SQ105, the MFP 100 transmits a request including the generated XML text to the reply destination URL described in the XML text received in STEP SQ103. The destination of the request which the MFP 100 transmits is the reply destination URL shown in FIG. 6B.

In STEP SQ106, the instruction device 200 reads the setting values and the setting identifiers from the XML text received from the MFP 100. Next, in STEP SQ106, the instruction device 200 generates an XML text which describes a plurality of candidate values for a setting value of each of the resolution for scanning, the sheet size for scanning, and the data format for scanning, which are setting items related to scan setting, and the read setting value of the corresponding setting item. The setting values are described as initial values in the XML text. Further, the XML text describes the URL of the instructing module 204b-3 for storing setting values as shown in FIG. 6C, as the reply destination URL. An example of the XML text which is generated in STEP SQ106 is shown in FIG. 6C.

In STEP SQ107, the instruction device 200 transmits the XML text generated in STEP SQ106, to the MFP 100.

In STEP SQ108, the MFP 100 analyzes the received XML text, and displays a setting screen for receiving selection of a setting value for each of the setting items related to scanning, as shown in FIG. 8B. In STEP SQ109, the user selects and inputs a desired setting value for each of the setting items, from the plurality of candidate values.

The MFP 100 generates an XML text which describes the setting values selected by the user, in association with the individual setting items. An example of the generated XML text is shown in FIG. 5B. Next, in STEP SQ110, the MFP 100 transmits a request including the generated XML text, to the reply destination URL described as shown in FIG. 6C in the XML text received in STEP SQ107.

In STEP SQ111, the instruction device 200 reads the setting values from the received XML text. Further, in STEP SQ111, the instruction device 200 generates an XML text which describes the setting identifiers assigned to the setting items related to scanning, and the read setting values. The generated XML text also includes the URL of the instructing module 204b-4 for finishing scan setting, as the reply destination URL. An example of the XML text generated in STEP SQ111 is shown in FIG. 6D. In STEP SQ112, the instruction device 200 transmits the generated XML text to the MFP 100.

Next, in STEP SQ113, the MFP 100 reads the setting identifiers and the setting values described in the received XML text. Further, in STEP SQ113, the MFP 100 stores the read setting values, as the setting values of the setting items specified by the read setting identifiers, in the setting-value management table 104a. Next, in STEP SQ114, the MFP 100 generates an XML text representing that the setting values have been stored, as shown in FIG. 5C. Further, in STEP SQ114, the MFP 100 transmits a result notification including the generated XML text, to the reply destination URL described in the XML text received in STEP SQ112.

As described above, the instruction device 200 instructs the MFP 100 to read and transmit the setting values stored in the setting-value management table 104a. Next, the instruction device 200 designates the initial values, and instructs the MFP 100 to display a screen for receiving setting values for various setting items from the user. Subsequently, the instruction device 200 instructs the MFP 100 to transmit the setting values received from the user, to the instruction device 200. Next, the instruction device 200 instructs the MFP 100 to store the designated values as setting values for various setting items in the setting-value management table 104a. According to this series of instructions, even if the MFP 100 has no firmware for displaying a setting screen for receiving changes of setting values, it is possible to make the MFP 100 receive changes of the setting values. Incidentally, setting values related to scanning is one example of operation information.

[Email Setting]

As shown in FIG. 12, in STEP SQ201, the user touches the instruction icon 120 representing 'EMAIL SETTING', on the screen displayed as shown in FIG. 8A on the display unit 109.

In STEP SQ202, the MFP 100 transmits a request having the URL of the XML text 204c-1 for instructing email setting, as the destination.

In STEP SQ203, the instruction device 200 reads the XML text 204c-1 for instructing email setting, and transmits the XML text 204c-1 to the MFP 100. As shown in FIG. 6E, the XML text 204c-1 for instructing email setting describes the setting identifiers assigned to the setting items related to emails. Also, the XML text 204c-1 for instructing email setting describes the URL of the instructing module 204c-2 for finishing email setting, as the reply destination URL.

In STEPS SQ204 to SQ209, the MFP 100 reads the setting values of 'SMTP SERVER', 'SERVER PORT', 'Auth. For SMTP', 'EMAIL ADDRESS', 'ACCOUNT NAME' and 'PASSWORD', which are the setting items having the setting identifiers described in the received XML text, from the setting-value management table 104a. Next, in STEP SQ210, the MFP 100 displays a setting-value input screen having the read setting values as initial values.

In STEP SQ211, the user inputs setting values for the individual setting items related to emails on the setting screen.

In STEPS SQ212 to SQ217, the MFP 100 stores the input setting values for the individual setting items, in the setting-value management table 104a.

In STEP SQ218, the MFP 100 generates an XML text representing the result of storing of the setting values for the individual setting items. An example of the generated XML text is shown in FIG. 5D. Further, in STEP SQ218, the MFP 100 transmits a result notification including the generated XML text to the reply destination URL described in the XML text received in STEP SQ203.

As described above, the instruction device 200 designates the setting identifiers assigned to the setting items stored in the setting-value management table 104a, and instructs the MFP 100 to receive input of setting values. According to this instruction of the instruction device 200, even if the MFP 100 has no firmware for displaying a setting screen for receiving changes of setting values, it is possible to make the MFP 100 display a screen for receiving changes of the setting values.

The MFP 100 can determine whether the instruction from the instruction device 200 is an instruction for receiving information, such as the setting values related to scanning, other than private information from the input unit 108 or an instruction for receiving private information, such as an account name, a password, and the like unique to the user, from the input unit 108. If the MFP 100 determines that the instruction from the instruction device 200 is information for receiving information other than private information, the MFP 100 transmits input values received from the input unit 108, to the instruction device. On the other hand, if the MFP 100 determines that the instruction from the instruction device is an instruction for receiving private information, the MFP 100 does not transmit input values received from the input unit 108, to the instruction device 200. Therefore, it is possible to prevent private information input from the input unit 108 of the MFP from being transmitted to the instruction device while expanding the capacity of the MFP by the instruction device 200.

[ScanToEmail]

Figure 13:
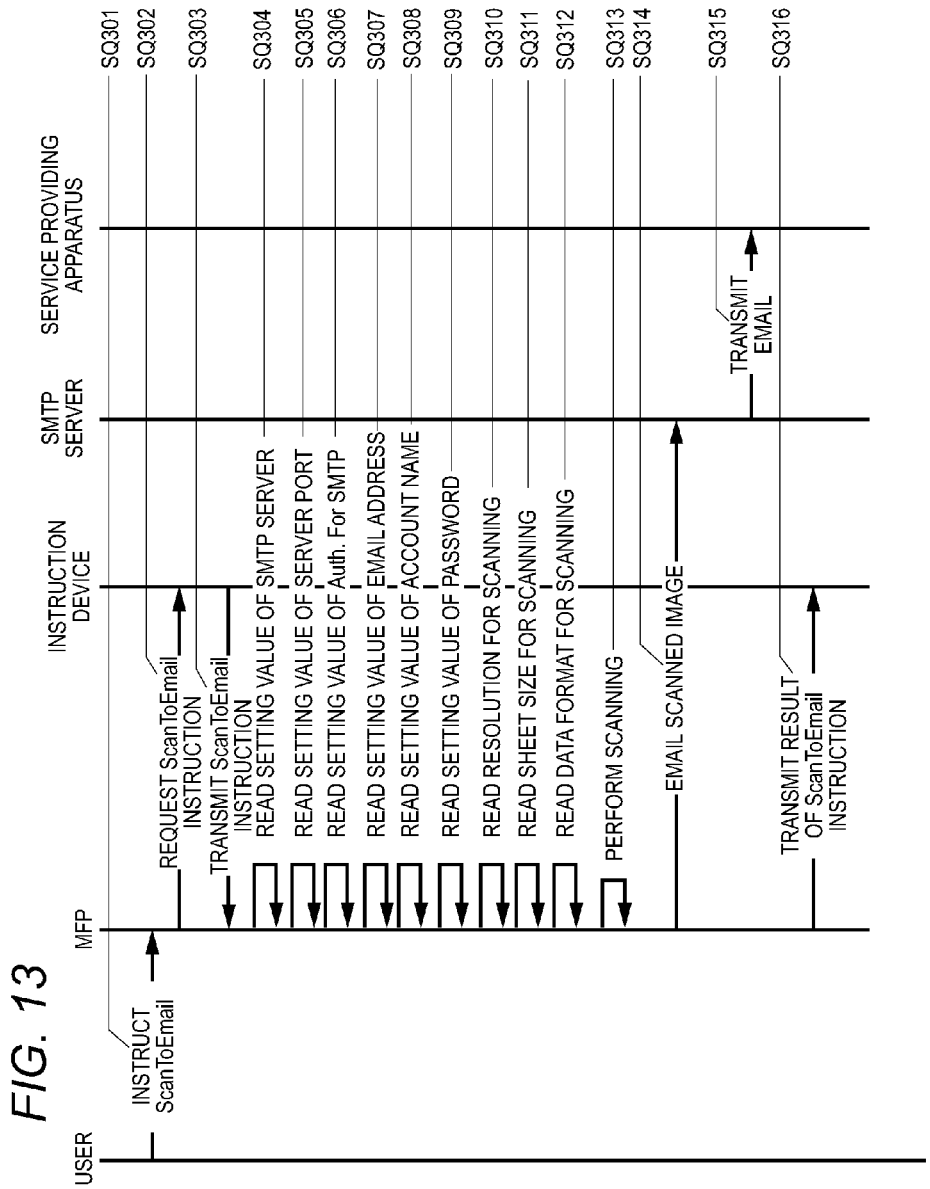
FIG. 13 is a sequence diagram illustrating a process procedure in which the MFP performs ScanToEmail in accordance with an XML text that is received from the instruction device.

As shown in FIG. 13, in STEP SQ301, the user touches the instruction icon 120 representing 'ScanToEmail' on a screen displayed as shown in FIG. 8A on the display unit 109.

In STEP SQ302, the MFP 100 transmits a request having the XML text 204d-1 for instructing ScanToEmail, as the destination.

In STEP SQ303, the instruction device 200 reads the XML text 204d-1 for instructing ScanToEmail, and transmits the read XML text to the MFP 100. As shown in FIG. 6F, the XML text 204d-1 for instructing ScanToEmail describes the URL of the instructing module 204c-2 for finishing email setting, as the reply destination URL.

In STEPS SQ304 to SQ309, the MFP 100 reads the setting values of 'SMTP SERVER', 'SERVER PORT', 'Auth. For SMTP', 'EMAIL ADDRESS', 'ACCOUNT NAME' and 'PASSWORD' necessary for email transmission, from the setting-value management table 104a.

In STEPS SQ310 to SQ312, the MFP 100 reads the setting values of the resolution for scanning, the sheet size for scanning, and the data format for scanning, which are setting items related to scanning, from the setting-value management table 104a.

In STEP SQ313, the MFP 100 controls the reading unit 107, such that scanning is performed. The scanning is performed in accordance with the setting values read in STEPS SQ310 to SQ312.

In STEP SQ314, the MFP 100 attaches the scan data to an email and transmits the email. The MFP 100 uses the values read in STEPS SQ304 to SQ309, as the setting values necessary for email transmission.

Upon receiving the email transmitted from the MFP 100, in STEP SQ315, the SMTP server 300 transmits the received email to the service providing server 400 set as the destination of the email.

In STEP SQ316, the MFP 100 transmits an XML text representing completion of ScanToEmail as shown in FIG. 5E, to the instruction device 200.

Modifications to Exemplary Embodiments

Modification(s) Related to Printing of Image Received by Email

In the above-described exemplary embodiment, the MFP 100 performs scan setting, email setting, and ScanToEmail in accordance with the XML texts received from the instruction device 200. According to the present invention, the MFP 100 can perform other processes. For example, the MFP 100 can perform print setting, email-reception setting, and a process of receiving an email and printing an image file attached to the received email (hereinafter, referred to reception-image print).

The MFP 100 can perform the print setting by the same method as that for the scan setting. However, in order to enable the MFP 100 to perform the print setting, it is necessary to store setting identifiers, setting values, and input formats assigned to setting items related to print, in the setting-value management table 104a. Further, the instruction device 200 transmits an instruction for setting the setting items related to print, instead of the instruction for setting the setting items related to scanning, to the MFP 100 in the process of FIG. 10B.

The MFP 100 can perform the email-reception setting by the same method as that for the email setting. However, in order to enable the MFP 100 to perform the email-reception setting, it is necessary to store setting identifiers, setting values, and input formats assigned to setting items (that is, 'POP SERVER', 'POP SERVER PORT', 'ON OR OFF OF APOP', 'POP ACCOUNT NAME' AND 'PASSWORD (OF POP)') related to the email-reception setting. Further, the instruction device 200 transmits an instruction for setting the setting items related to email reception, instead of the instruction for setting the setting items related to emails, to the MFP 100 in the process of FIG. 10C.

In order to enable the MFP 100 to perform reception-image print, the CPU 101 according to the entire control program 102a needs to be able to determine an XML text describing 'RECEPTION-IMAGE PRINT' as a command name. Further, it is necessary to store a program for performing the following process in the ROM 102. The CPU 101 reads the setting values related to email reception, from the setting-value management table 104a. The CPU 101 controls the network I/F such that the MFP 100 is connected to a POP server by using the read setting values. The CPU 101 makes the printing unit 106 print an image file attached to an email received by the network I/F. In other words, the print is performed in accordance with the setting values of the items for print stored in the setting-value management table 104a. Further, the instruction device 200 transmits an instruction for a reception-image printing process, instead of the process of instructing ScanToEmail, to the MFP 100 to the process of FIG. 10D.

(First Modification of Transmission XML Text of Instruction Device 200)

In the scan setting shown in FIG. 11, in STEPS SQ106, SQ107, SQ111, and SQ112, the instruction device 200 reads the command result parameters described the XML text received from the MFP 100, generates the XML text reflecting the read command result parameters, and transmits the XML text to the MFP 100. However, the instruction device 200 may transmit an operation instruction such as an XML text that does not reflect operation information such as the command result parameters described in the XML text received from the MFP 100, to the MFP 100. For example, the following process can be considered. It is assumed that there are predetermined setting values stored as setting values for the setting items related to scanning in the instruction device 200. In a case where the setting values described in the XML text received in STEP SQ105 are the predetermined setting values, in order to finish the scan setting, the instruction device 200 transmits the XML text 204a for the menu to the MFP 100. On the other hand, in a case where the setting values described in the XML text received in STEP SQ105 are not the predetermined setting values, the instruction device 200 transmits an XML text, which describes 'SETTING-VALUE STORAGE' as a command name, and describes pairs of the setting identifiers and predetermined setting values of the items related to scanning, as command parameters, to the MFP 100.

(Second Modification of Transmission XML Text of Instruction Device 200)

As shown in FIG. 3, the instruction device 200 stores one XML text 204a for the menu. However, the instruction device 200 may store two or more XML texts for menus. An example of a case where the instruction device 200 stores two or more XML texts for menus is as follows.

Figure 15A:
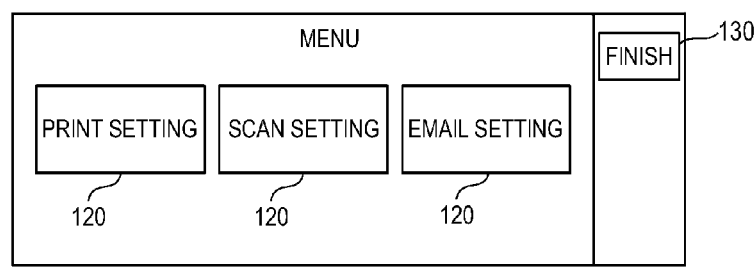

An XML text for a menu shown in FIG. 14A describes command parameters which are pairs of icon names 'PRINT SETTING', 'SCAN SETTING', and 'EMAIL SETTING', and reply destination URLs corresponding to the icon names, respectively. Upon receiving this XML text, the MFP 100 displays a screen shown in FIG. 15A. If the user touches an instruction icon 120 representing 'PRINT SETTING', or an instruction icon 120 representing 'SCAN SETTING' on the display screen shown in FIG. 15A, the MFP 100 performs print setting or scan setting by the method according to the above-described exemplary embodiment and modifications.

Meanwhile, if the user touches an instruction icon 120 representing email setting, the MFP 100 transmits a request having a reply destination URL of 'http://XYZ/menu2.xml' as a destination as shown in FIG. 14A. Then, the instruction device 200 transmits an XML text for a menu stored in an area of the HDD 202 designated by 'http://XYZ/menu2.xml', as a replay for the request received from the MFP 100, to the MFP 100. FIG. 14B shows the XML text which the instruction device stores in the area of the HDD 202 designated by 'http://XYZ/menu2.xml'.

Figure 15B:
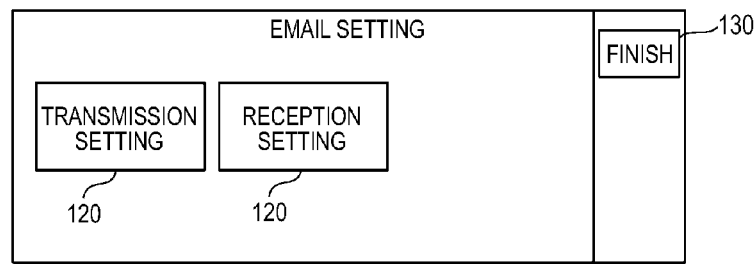

Upon receiving the XML text shown in FIG. 14B, the MFP 100 displays a display screen shown in FIG. 15B. When the user touches an instruction icon 120 representing transmission setting on the display screen shown in FIG. 15B, the MFP 100 performs the email setting according to the above-described exemplary embodiment, in cooperation with the instruction device 200. Meanwhile, if the user touches an instruction icon 120 representing reception setting on the display screen shown in FIG. 15B, the MFP 100 performs the email-reception setting described in the modification related to print of an image received by email, in cooperation with the instruction device 200.

If additional XML texts and programs are provided to the instructing programs 204 as described with respect to the modifications, the MFP 100 can perform more processes.

(Modification(s) Related to Menu Screen that MFP 100 Displays)

In the above-described exemplary embodiment, the MFP 100 displays the menu screen in accordance with the XML text 204a for the menu received from the instruction device 200. However, the MFP 100 may be configured to store menu screen data for displaying a menu screen in the ROM 102 or the flash memory 104 in advance. The menu screen data includes at least data corresponding to the title and command parameters described in the XML text 204a for the menu. The CPU 101 reads the menu screen data, and makes the display unit 109 display the menu screen shown in FIG. 8A. Next, the CPU 101 receives touch of any one instruction icon 120 of the plurality of instruction icons 120 on the menu screen. Then, the CPU 101 reads a reply destination URL paired with an item name used for displaying the touched instruction icon 120, from the menu screen data. Next, the CPU 101 transmits a request having the read reply destination URL as a destination, to the network I/F 105.

In the above-described exemplary embodiment, the input unit 108 and the menu screen shown in FIG. 8A are examples of a function selecting unit. STEPS SQ102, SQ202, and SQ302 are examples of an instruction requesting unit. The input unit 108 and processes of STEPS SQ109 and SQ211 are examples of an input-information receiving unit. STEP MS506 is an example of an operation-setting function unit. STEP SQ110 is an example of an operation-information transmitting unit. STEPS SQ210, and SQ212 to SQ217 are examples of a user-setting function unit. STEPS SQ103, SQ203, and SQ303 are examples of a replay instructing unit. STEPS SQ111 and SQ112 are examples of an operation instructing unit.

What is claimed is:

1. A multi-function peripheral configured to be connected to an instruction device and perform each operation function of a plurality of operation functions in accordance with an instruction from the instruction device, the multi-function peripheral comprising:
an input unit;
a communication unit; and
a controller configured to perform:
a function selecting process of selecting one operation function designated through the input unit, the operation function selected from the plurality of operation functions;
an instruction obtaining process of transmitting a first instruction request for performing the operation function selected in the function selecting process to the instruction device, and receiving a first response instruction from the instruction device, via the communication unit;
an operation-setting function process comprising:
if the first response instruction received in the instruction obtaining process indicates performing an operation-setting function from among the plurality of operation functions, in accordance with the received first response instruction, receiving operation information through the input unit; and
transmitting a second instruction request including the operation information to the instruction device;
receiving a second response instruction indicating storing the operation information, the operation information being included in the second response instruction; and
storing the operation information included in the received second response instruction in a memory of the multi-function peripheral; and
a user-setting function process comprising:
if the first response instruction received in the instruction obtaining process indicates performing a user-setting function from among the plurality of operation functions,
in accordance with the received first response instruction, receiving user-specific information through the input unit and storing the received user-specific information,
wherein the controller is configured to further perform an instruction identifying process of identifying the received first response instruction, and
wherein, in a case where the user-setting function is a secret-setting, the multi-function peripheral does not transmit the user-specific information to the instruction device.

2. The multi-function peripheral according to claim 1, wherein the controller is configured to further perform:
an instruction identifying process of identifying a response instruction received from the instruction device,
wherein the controller is configured to, if the received response instruction is identified, in the instruction identifying process, as the first response instruction for performing the operation-setting function, store the operation information in the operation-setting function process, and
wherein the controller is configured to, if the received response instruction is identified, in the instruction identifying process, as the first response instruction for performing the user-setting function, store the user-specific information in the user-setting function process.

3. The multi-function peripheral according to claim 1, further comprising a non-volatile memory,
wherein the controller is configured to store the received user-specific information in the non-volatile memory in the user-setting function process, and
wherein the controller is further configured to perform a user-specific information transmitting process of transmitting the user-specific information stored in the non-volatile memory to a server connected with the multi-function peripheral via the communication unit, for using a service provided by the server.

4. The multi-function peripheral according to claim 1, wherein the controller is further configured to perform:
an operation-completion notifying process of transmitting a completion notification, which represents completion of an operation of the operation-setting function including storing of the operation information, to the instruction device via the communication unit when storing the operation information, in accordance with the received first response instruction, is completed; and
a user-completion notifying process of transmitting a completion notification, which represents completion of the user-specific information setting of the user-setting function process, to the instruction device via the communication unit when setting the user-specific information is completed.

5. The multi-function peripheral according to claim 4, wherein the controller is configured to determine, in the user-setting function process, whether a storing operation has been performed with respect to a predetermined user-specific information item, and
wherein the controller is configured to, when the controller determines that the setting operation has been performed with respect to the predetermined user-specific information item, transmit the completion notification, which includes a result representing appropriateness of the storing with respect to the predetermined user-specific information item, in the user-completion notifying process.

6. The multi-function peripheral according to claim 5, wherein the controller is configured to determine, in the user-setting function process, whether a storing operation has been performed with respect to the user-specific information item designated in accordance with the first response instruction received from the instruction device.

7. The multi-function peripheral according to claim 4, wherein the controller is configured to determine, in the operation-setting function process, whether the operation information is stored with respect to a predetermined operation information item, and
wherein the controller is configured to, when it is determined in the operation-setting function process that the operation information is stored with respect to the predetermined operation information item, transmits, in the operation-completion notifying process, a completion notification which includes stored results representing appropriateness of the storing with respect to the predetermined operation information item.

8. The multi-function peripheral according to claim 7, wherein the controller is configured to determine, in the operation-setting function process, whether the operation information is stored with respect to an operation-setting item designated in accordance with the first response instruction received from the instruction device as the predetermined operation information item.

9. The multi-function peripheral according to claim 1, the memory comprising a non-volatile memory and a display unit,
wherein the non-volatile memory is configured to store a plurality of stored operation information items,
wherein the controller is further configured to perform the instruction obtaining process further comprising;
after transmitting the first instruction request, receiving a third response instruction;
in response to receiving the third response instruction, acquiring a particular operation information item stored in the non-volatile memory;
transmitting a third instruction request including the acquired operation information item to the instruction device: and
after transmitting the third instruction request, receiving the first response instruction from the instruction device; and
wherein the controller is further configured to perform:
a displaying process of, in response to receiving the first response instruction, displaying an input information acceptance screen for receiving the operation information on the display unit in accordance with the received first response instruction,
wherein the controller is configured to receive the operation information in a state in which the input information acceptance screen is being displayed.

10. The multi-function peripheral according to claim 9,
wherein the controller is configured to transmit, in the operation-information transmitting process, the operation information with respect to the operation information item designated in accordance with the third response instruction received from the instruction device as the predetermined stored operation information item.

11. The multi-function peripheral according to claim 1,
wherein the controller is configured to store the operation information after receiving each of a plurality of the response instructions,
wherein the controller is configured to store the user-specific information after receiving the first response instruction once.

12. The multi-function peripheral according to claim 1,
wherein the controller is configured to select, in the function selecting process, one operation function from the plurality of operation functions including a scan setting function for setting operation information for a scanning operation of reading an image,
wherein the controller is configured to, if the scan setting function is selected from the plurality of operation functions in the function selecting process,
receive the response instruction, in the operation-setting function process, for performing the scan setting function from the instruction device, and
store the operation information for the scanning operation in accordance with the received first response instruction.

13. The multi-function peripheral according to claim 1,
wherein the controller is configured to select, in the function selecting process, one operation function from the plurality of operation functions including an email setting function of setting user-specific information related to email transmission for transmitting an email from the multi-function peripheral to a mail server connected to the multi-function peripheral via the communication unit,
wherein the controller is configured to, if the email setting function is selected from the plurality of operation functions in the function selecting process,
receive a response instruction, in the user-setting function process, for performing the email setting function from the instruction device, and
store user-specific information including user identification information in accordance with the received first response instruction.

14. The multi-function peripheral according to claim 1,
wherein the controller is further configured to determine, after receiving the first response instruction, whether the first response instruction is an instruction for receiving private information;
wherein, if the controller determines that the first response instruction does not result in receiving private information, input values are transmitted to the instruction device; and
wherein, if it is determined that the first response instruction results in receiving private information, input values are not transmitted to the instruction device.

15. A communication system comprising:
a multi-function peripheral configured to perform a plurality of operation functions; and
an instruction device configured to be connected to the multi-function peripheral and transmit an instruction for performing each operation function of the plurality of operation functions to the multi-function peripheral,
wherein the multi-function peripheral comprises:
an input unit;
a first communication unit; and
a first controller configured to perform:
a function selecting process of selecting one operation function designated through the input unit, the operation function selected from the plurality of operation functions;
an instruction obtaining process of transmitting an instruction request for performing the operation function selected in the function selecting process to the instruction device, and receiving a first response instruction as a response to the instruction request, via the first communication unit;
an operation-setting function process comprising:
if the first response instruction received in the instruction obtaining process indicates performing an operation-setting function from among the plurality of operation functions, in accordance with the received first response instruction, receiving operation information from the instruction device; and
transmitting a second instruction request including the operation information to the instruction device;
receiving a second response instruction indicating storing the operation information, the operation information being included in the second response instruction; and
storing the operation information included in the received second response instruction in a memory of the multi-function peripheral; and
a user-setting function process comprising:
if the first response received in the instruction obtaining process indicates performing a user-setting function from among the plurality of operation functions,
in accordance with the received first response instruction, receiving user-specific information from the instruction device and storing the received user-specific information, wherein the instruction device comprises:
a second communication unit; and
a second controller configured to perform:
a response instruction process of receiving the instruction request, via the second communication unit, which the multi-function peripheral transmits in the instruction obtaining process and transmitting the first response instruction for performing the selected operation function to the multi-function peripheral in response to the instruction request via the second communication unit; and
an operation instructing process comprising:
receiving the second instruction request including the operation information;
generating the first response instruction for performing the operation-setting function on a basis of the received operation information; and
transmitting the generated first response instruction to the multi-function peripheral,
wherein the first controller of the multi-function peripheral is configured to further perform an instruction identifying process of identifying the received first response instruction, and
wherein, in a case where the user-setting function is a secret-setting, the multi-function peripheral does not transmit the user-specific information to the instruction device.

16. The communication system according to claim 15, wherein the first controller of the multi-function peripheral is configured to further perform:
an operation-completion notifying process of transmitting a completion notification, which represents completion of an operation of the operation-setting function process including storing of the operation information, to the instruction device via the first communication unit when storing the operation information, in accordance with the received first response instruction, is completed; and
a user-completion notifying process of transmitting a completion notification, which represents completion of the user-setting function process, to the instruction device via the first communication unit when receipt of the user-specific information, on the basis of the input information, is completed.

17. A communication method for a multi-function peripheral configured to be connected to an instruction device and perform a plurality of operation functions in accordance with an instruction from the instruction device, the multi-function peripheral including an input unit and a communication unit configured to communicate with the instruction device, the communication method comprising:
a function selecting step of selecting one operation function designated through the input unit from the plurality of operation functions;
an instruction obtaining step of transmitting a first instruction request for performing the operation function selected in the function selecting step to the instruction device via the communication unit and receiving a first response instruction as a response to the first instruction request;
if the first response instruction received in the instruction obtaining step indicates performing an operation-setting function is indicated as the operation function from among the plurality of operation functions in accordance with the received first response instruction:
receiving operation information through the input unit; and
transmitting a second instruction request including the operation information to the instruction device;
receiving a second response instruction for storing the operation information included therein; and
storing the operation information included in the received second response instruction in a memory of the multi-function peripheral;
if the first response instruction received in the instruction obtaining step indicates performing a user-setting function from among the plurality of operation functions:
in accordance with the received first response instruction, receiving user-specific information through the input unit and storing the received user-specific information,
wherein the operation-setting function is completed after transmitting the operation information to the instruction device and the user-setting function is completed without transmitting the input information based on a determination that the user-setting function is a secret-setting.

18. A non-transitory computer-readable recording medium storing a program for controlling a multi-function peripheral, which is configured to be connected to an instruction device and perform a plurality of operation functions in accordance with an instruction from the instruction device, the multi-function peripheral including an input unit, a communication unit configured to communicate with the instruction device and a computer, the program, when executed by the computer, causes the computer to perform processes comprising:
a function selecting process of selecting one operation function designated through the input unit, the operation function selected from the plurality of operation functions;
an instruction obtaining process of transmitting a first instruction request for performing the operation function selected in the function selecting process to the instruction device, and receiving a first response instruction as a response to the first instruction request, via the communication unit;
an operation-setting process comprising:
if the first response instruction received in the instruction obtaining process indicates performing an operation-setting function from among the plurality of operation functions, in accordance with the received first response instruction, receiving operation information through the input unit;
transmitting a second instruction request including the operation information to the instruction device;
receiving a second response instruction indicating storing the operation information, the operation information being included in the second response instruction; and
storing the operation information included in the received second response instruction in a memory of the multi-function peripheral; and
a user-setting process comprising:
if the first response received in the instruction obtaining process indicates performing a user-setting function from among the plurality of operation functions,
in accordance with the received response instruction, receiving user-specific information through the input unit and storing the received user-specific information,
wherein the operation-setting function process is completed after the operation information is transmitted, and the user-setting function process is completed without transmitting the input information based on a determination that the user-setting function is a secret-setting.

* * * * *